(12) United States Patent
Dyer et al.

(10) Patent No.: US 10,988,137 B2
(45) Date of Patent: Apr. 27, 2021

(54) DRIVEWAY MANEUVERS FOR AUTONOMOUS VEHICLES

(71) Applicant: Waymo LLC, Mountain View, CA (US)

(72) Inventors: John Wesley Dyer, Mountain View, CA (US); Michael Epstein, Danville, CA (US); Jonathan Lee Pedersen, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 248 days.

(21) Appl. No.: 16/208,691

(22) Filed: Dec. 4, 2018

(65) Prior Publication Data

US 2020/0172089 A1  Jun. 4, 2020

(51) Int. Cl.
*B60W 30/06* (2006.01)
*G08G 1/16* (2006.01)
*G05D 1/00* (2006.01)
*G05D 1/02* (2020.01)

(52) U.S. Cl.
CPC .......... *B60W 30/06* (2013.01); *G05D 1/0088* (2013.01); *G05D 1/0221* (2013.01); *G08G 1/168* (2013.01); *G05D 2201/0213* (2013.01)

(58) Field of Classification Search
CPC ....... B60W 30/06; G08G 1/168; G08G 1/202; G05D 1/0221; G05D 1/0088; G05D 2201/0213
See application file for complete search history.

(56) References Cited

U.S. PATENT DOCUMENTS

| 9,733,096 | B2 | 8/2017 | Colijn et al. | |
| 9,754,490 | B2 | 9/2017 | Kentley et al. | |
| 2016/0370194 | A1* | 12/2016 | Colijn | G08G 1/22 |
| 2017/0132934 | A1* | 5/2017 | Kentley | G08G 1/202 |
| 2017/0329346 | A1* | 11/2017 | Latotzki | G05D 1/0088 |

FOREIGN PATENT DOCUMENTS

| WO | 2016183525 A1 | 11/2016 | |
| WO | 2017221022 A1 | 12/2017 | |
| WO | WO-2020062030 A1 * | 4/2020 | ........... G05D 1/0217 |

* cited by examiner

*Primary Examiner* — Anne Marie Antonucci
(74) *Attorney, Agent, or Firm* — Botos Churchill IP Law

(57) ABSTRACT

Aspects of the disclosure provide for controlling an autonomous vehicle to enter a driveway. As an example, an instruction to pickup or drop off a passenger at a location may be received. It may be determined that the vehicle is arriving in a lane on an opposite side of a street as the location, the lane having a traffic direction opposite to a traffic direction of a lane adjacent to the location. A difficulty score to maneuver the vehicle to the lane adjacent to the location may be determined, and the difficulty score may be compared to a predetermined difficulty score. Based on the comparison, it may be determined to an available driveway on the same side of the street as the location. The vehicle may be controlled to enter the available driveway.

20 Claims, 16 Drawing Sheets

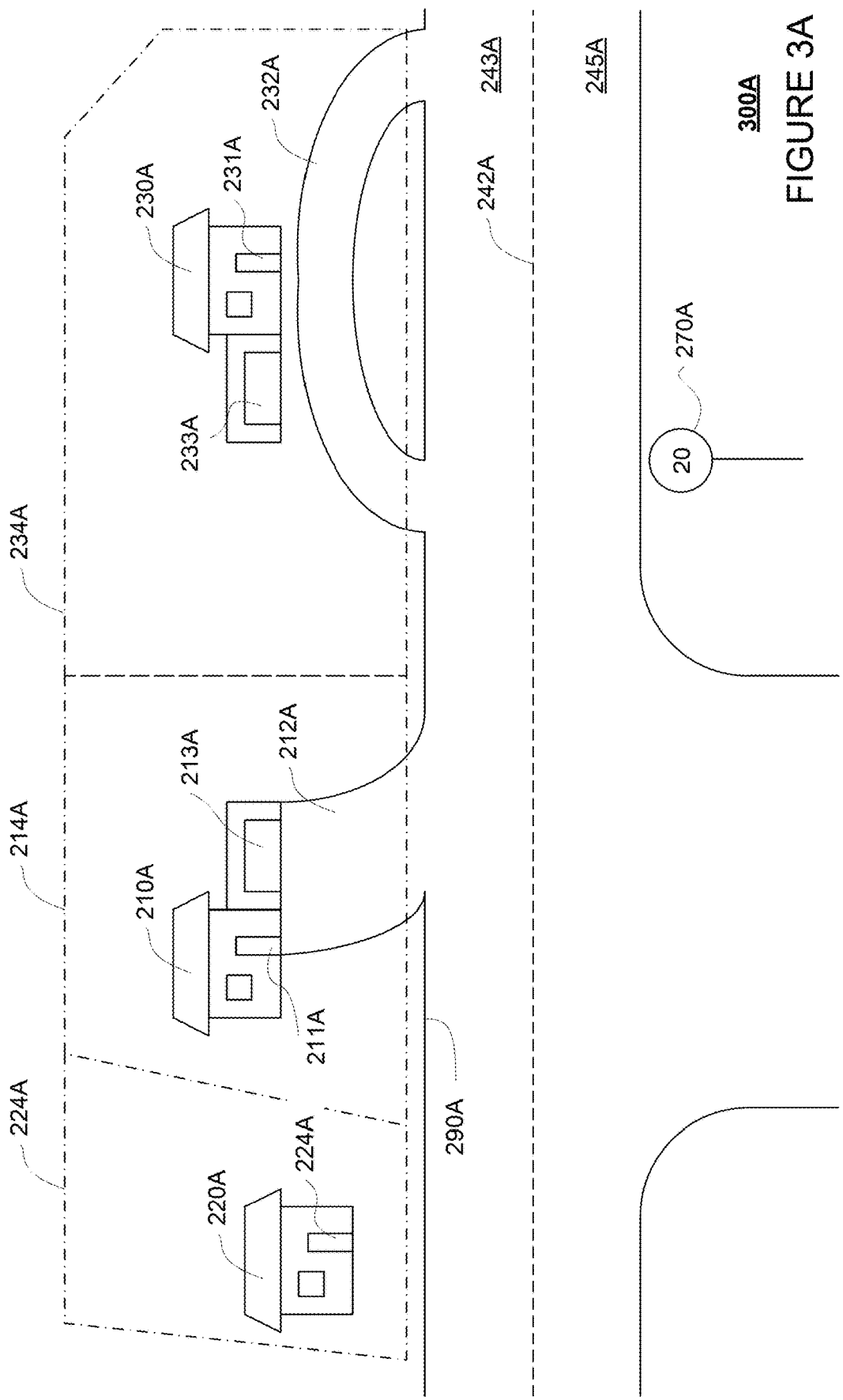

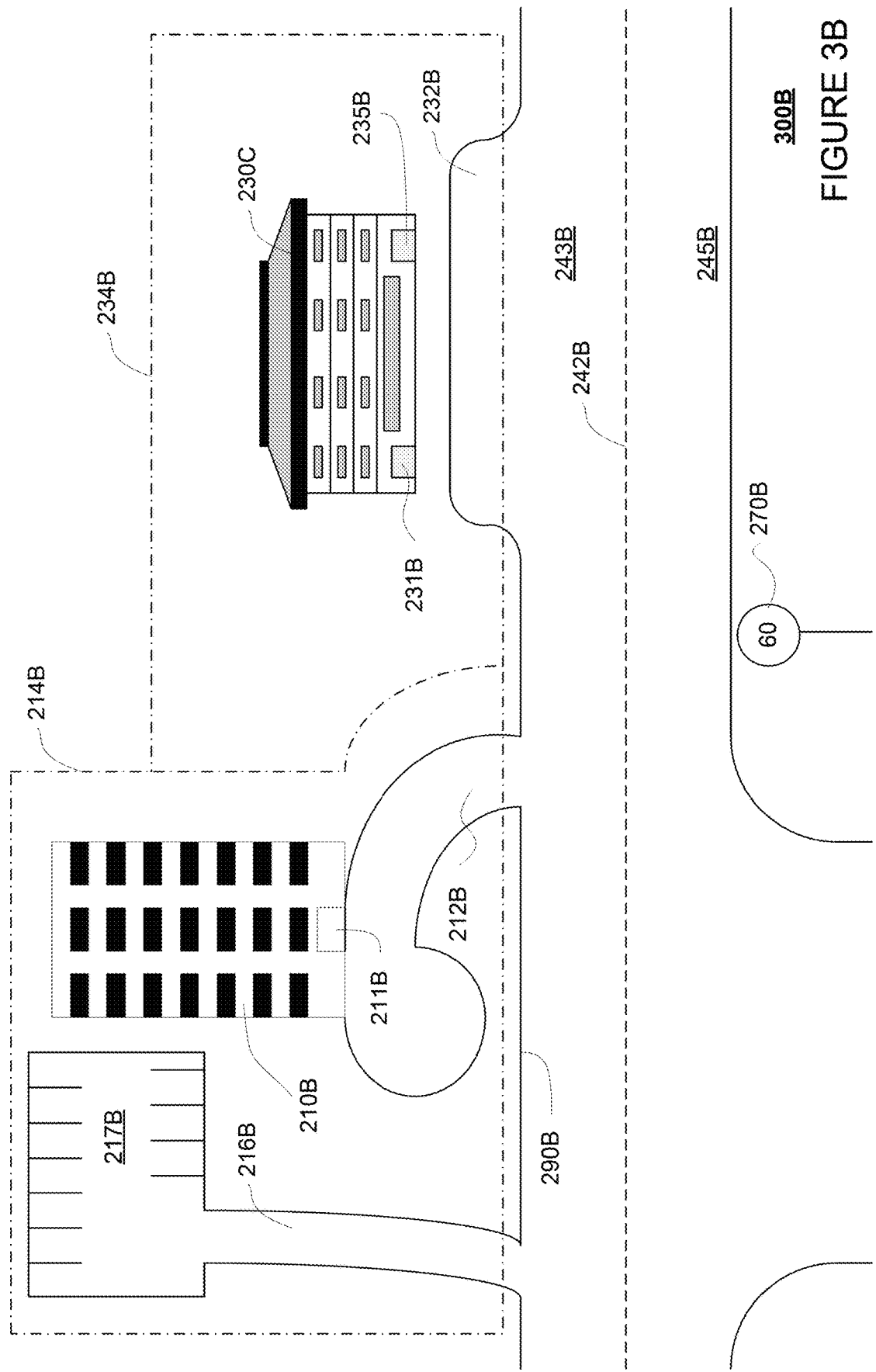

900A

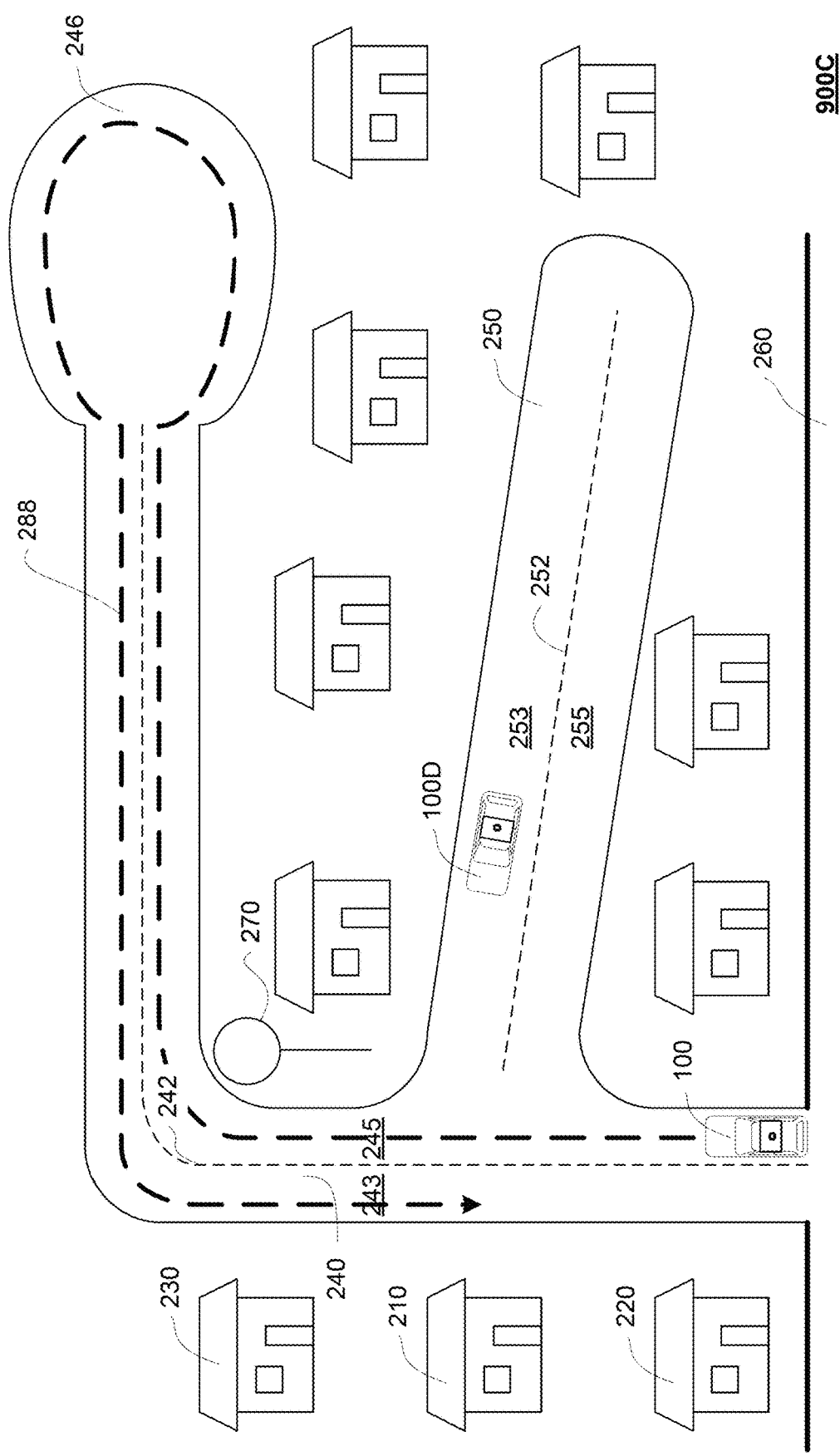

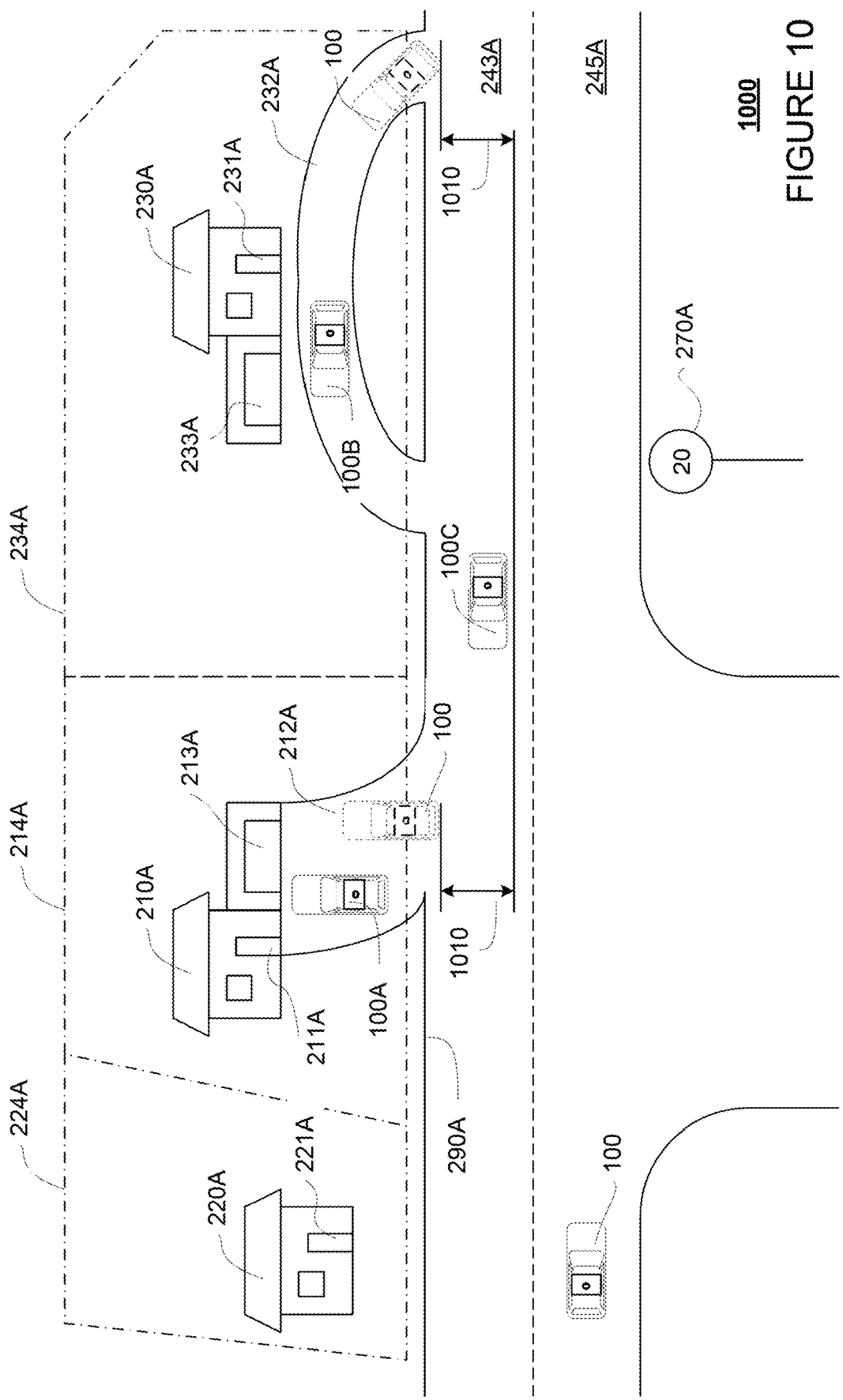

DRIVEWAY MANEUVERS FOR AUTONOMOUS VEHICLES

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or drop-off location, and the vehicle maneuvers itself to that location.

When a person (or user) wants to be physically transported between two locations via a vehicle, they may use any number of transportation services. To date, these services typically involve a human driver who is given dispatch instructions to a location to pick up the user. For example, when a human driver performs a pickup at a passenger's residence and arrives on the opposite side of the street as the residence, a human driver may decide whether it is appropriate to pull into the driveway of the residence to perform the pickup, and how to maneuver the vehicle while inside the driveway. As such, a human driver may be able to determine how to best reduce inconvenience to the passenger and other road users around the pickup location. This is not readily achievable in the case of autonomous vehicles which do not have a human driver.

BRIEF SUMMARY

Aspects of the disclosure provides for receiving, by one or more processors, an instruction to pickup or drop off a passenger at a location; determining, by the one or more processors, that the vehicle is arriving in a lane on an opposite side of a street as the location, the lane having a traffic direction opposite to a traffic direction of a lane adjacent to the location; determining, by the one or more processors, a difficulty score to maneuver the vehicle to the lane adjacent to the location; comparing, by the one or more processors, the difficulty score to a predetermined difficulty threshold; determining, by the one or more processors based on the comparison, to enter an available driveway on a same side of the street as the location; and controlling, by the one or more processors based on the determination to enter the available driveway, the vehicle to enter the available driveway.

The method may further include determining, by the one or more processors, an amount of time required to maneuver the vehicle to the lane adjacent to the location, wherein the determining the difficulty score is further based on the amount of time required to maneuver the vehicle. The method may further include determining, by the one or more processors based on sensor data from a perception system, whether the vehicle is blocking traffic, wherein the determining the difficulty score is further based on whether the vehicle is blocking traffic. The difficulty score may be determined further based on dimensions of one or more roads on which the maneuver is to be performed. The determining to enter an available driveway may be further based on the difficulty score being higher than the predetermined difficulty threshold.

The method may further include determining by the one or more processors, a first convenience cost to the passenger for picking up or dropping off the passenger on the opposite side of the street as the location; determining, by the one or more processors, a second convenience cost to the passenger for picking up or dropping off the passenger on the same side of the street as the location; comparing, by the one or more processors, the first convenience cost to the second convenience cost; wherein the determining to enter an available driveway is further based on the comparison between the first convenience cost and the second convenience cost. The determining to enter an available driveway may be based on the first convenience cost being higher than the second convenience cost. The determining to enter an available driveway may be based on a difference between the first convenience cost and the second convenience cost meeting or exceeding a threshold. The determining to enter an available driveway may be further based on a danger level to cross the street. The determining to enter an available driveway may be further based on a necessity to maneuver to the same side of the street to complete a trip.

The method may further include determining, by the one or more processors, a driving region of the lane adjacent to the location; determining, by the one or more processors based on sensor data from a perception system, that there is sufficient space for the vehicle to enter the available driveway such that a rear end of the vehicle is outside of the driving region; and prior to determining to enter the available driveway, determining that the available driveway is available based on the determination that there is sufficient space.

The method may further include determining, by the one or more processors, that the available driveway is within a same set of lot boundaries as the location; selecting, by the one or more processors based on the determination that the available driveway is within the same set of lot boundaries as the location, the available driveway among a plurality of available driveways on the same side of the street as the location. The method may further include determining, by the one or more processors, that the available driveway is a closest driveway to an entrance of the location; selecting, by the one or more processors based on the determination that the available driveway is the closest driveway to an entrance of the location, the available driveway among a plurality of available driveways on the same side of the street as the location.

The method may further include determining, by the one or more processors, a driving region of the lane adjacent to the location, wherein the controlling the vehicle to enter the available driveway includes adjusting a position of the vehicle such that a rear end of the vehicle is at least a predetermined clearance distance away from the driving region. The controlling the vehicle to enter the available driveway may include adjusting a position of the vehicle such that at least one passenger door of the vehicle is at least a predetermined clearance distance away from an object in the available driveway. The controlling the vehicle to enter the available driveway may include adjusting a position of the vehicle such that the vehicle is at least a predetermined clearance distance away from an entrance of the location. The controlling of the vehicle to enter the available driveway may include controlling a speed of the vehicle below a threshold speed. The controlling of the vehicle to enter the available driveway may include controlling the vehicle to perform a multi-point turn on the available driveway. The controlling of the vehicle to enter the available driveway may include controlling the vehicle to maintain at least a predetermined clearance distance from an object on the available driveway.

The disclosure further provides for a system for maneuvering an autonomous vehicle to enter a driveway, the system comprising one or more processors configured to receive an instruction to pickup or drop off a passenger at a location; determine that the vehicle is arriving in a lane on an opposite side of a street as the location, the lane having a traffic direction opposite to a traffic direction of a lane adjacent to the location; determine a difficulty score to maneuver the vehicle to the lane adjacent to the location; compare the difficulty score to a predetermined difficulty score; determine, based on the comparison, to enter an available driveway on the same side of the street as the location; and control, based on the determination to enter the available driveway, the vehicle to enter the available driveway.

BRIEF DESCRIPTION OF THE DRAWINGS

FIGS. 3A and 3B are example representation of driveway information in accordance with aspects of the disclosure.

FIGS. 8-12 are examples of various situations in accordance with aspects of the disclosure.

DETAILED DESCRIPTION

Overview

Figure 1:
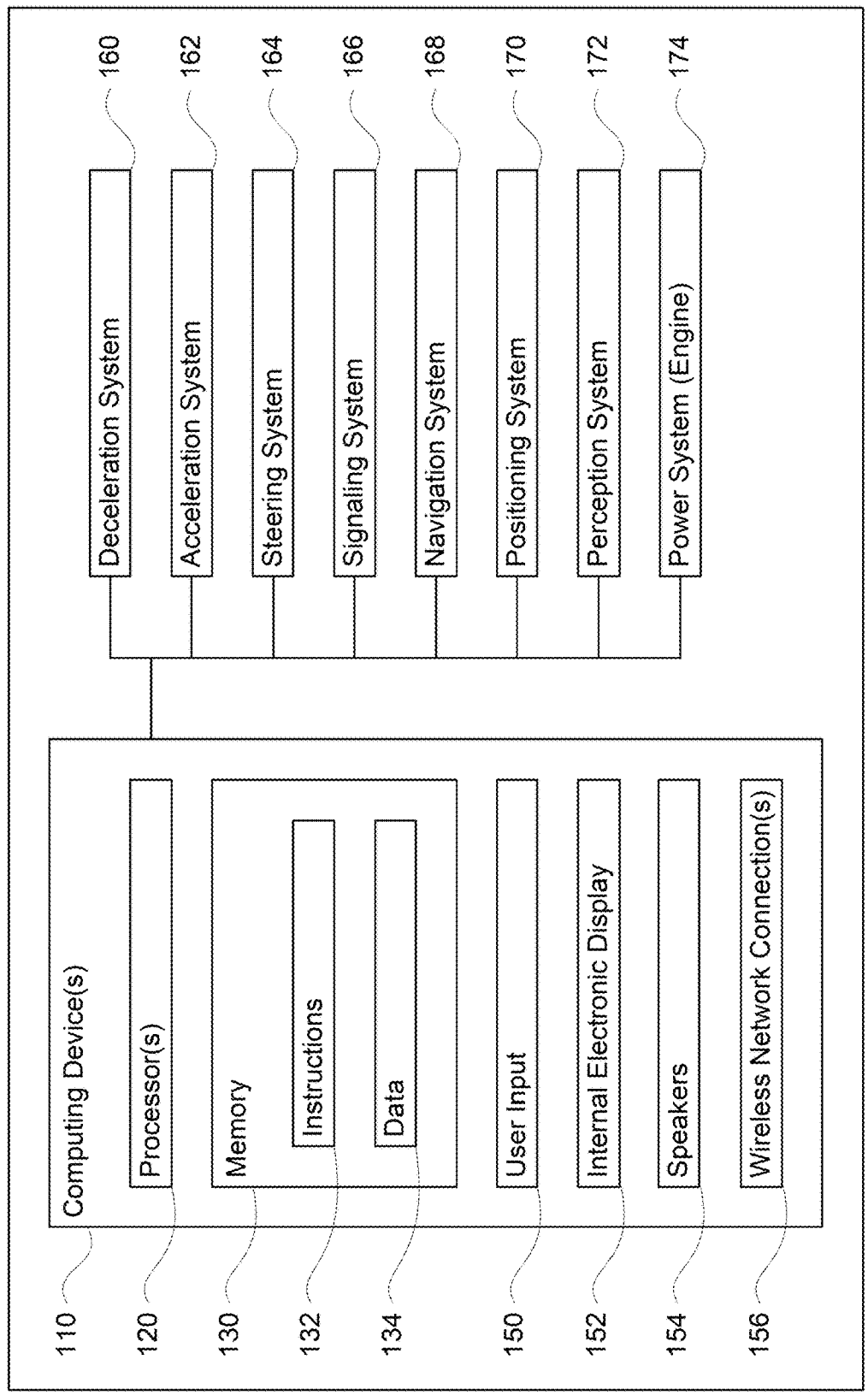
FIG. 1 is a functional diagram of an example vehicle in accordance with aspects of the disclosure.

The technology generally relates to an autonomous vehicle's behaviors for pulling into a driveway to perform a passenger pickup or drop-off. For instance, when an autonomous vehicle stops at a location to pick up or drop off a passenger (pick-up or drop-off location), the autonomous vehicle may potentially behave in a manner that inconvenience or annoy the passenger and other road users. For example, the autonomous vehicle may stop on the opposite side of the street as the pick-up or drop-off location or take a longer period of time to reach the location due to having to make complicated maneuvers or driving around in order to stop on the same side of the street as the location. Typically, when a human driver performs a pickup at a passenger's residence and arrives on the opposite side of the street as the residence, a human driver may decide whether it is appropriate to pull into the driveway of the residence to perform the pickup. Of course, autonomous vehicles are not able to make such judgments. To address this, the autonomous vehicle may be provided with capabilities and functionalities to make decisions about whether and how to use a driveway.

In this regard, the vehicle may receive an instruction to pick up or drop off a passenger at a pickup or drop-off location. In response, the vehicle may control itself in order to maneuver to the pickup or drop-off location using map information. As the vehicle approaches the pickup or drop-off location, the vehicle's computing devices may determine, based on map information and a route followed, that the vehicle is arriving in a lane on an opposite side of a street as the location, the lane having a traffic direction opposite to a traffic direction of a lane adjacent to the location. The vehicle's computing devices may compare a convenience cost to the passenger for performing the pickup or drop-off on the opposite side of the street as the location with a convenience cost to the passenger for performing the pickup or drop-off on the same side of the street as the location, and determine to maneuver to the same side of the street as the location to perform the pickup or drop-off.

As such, the vehicle's computing devices may determine a difficulty score for maneuvering the vehicle to a lane on the same side of the street as the pickup or drop off location. The vehicle's computing devices may compare the determined difficulty score with a predetermined difficulty threshold. Based on the comparison of the difficulty score with the predetermined difficulty threshold, the vehicle's computing devices may determine to enter an available driveway on the same side of the street as the location, instead of performing the maneuver to the lane adjacent to the location. In this regard, the vehicle's computing devices may determine whether there are one or more available driveways on the same side of the street as the pickup or drop off location, and if so, select an available driveway to enter.

The vehicle's computing devices may then control, based on the determination to enter the available driveway, the vehicle to enter the available driveway. In this regard, the vehicle's computing devices may use the sensor data to detect, identify and respond to objects on the street as well as in the driveway. To ensure safety as the vehicle enters into the driveway and while inside the driveway, the vehicle's computing devices may control the vehicle based on a number of predetermined rules. In addition, while inside the driveway, the vehicle's computing devices may control the vehicle to adjust its position for the convenience of the passenger and other road users.

The features described herein may enable autonomous vehicles to make independent determinations whether to enter a driveway to perform a passenger pick-up or drop-off. This may improve passenger experience with autonomous vehicles, as the passenger may avoid having to cross the street, or to wait a long time. Further, by controlling the autonomous vehicle according to heightened safety rules while on the driveway, the autonomous vehicle may be more responsive to its environment and less likely to injure pedestrians or damage private property. In addition, by controlling the autonomous vehicle to position itself clear from ongoing traffic and objects on the driveway, the autonomous vehicle may be less likely to block or inconvenience the passenger or other road users.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 30 to 60 degrees offset from a current path of vehicle 100." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing device 110 may be an autonomous driving computing system incorporated into vehicle 100. The autonomous driving computing system may capable of communicating with various components of the vehicle. For example, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The computing device 110 may control the direction and speed of the vehicle by controlling various components. By way of example, computing device 110 may navigate the vehicle to a drop-off location completely autonomously using data from the map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing device 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

In some examples, computing device 110 may be operable to control the vehicle 100 using "forward motion planning" as well as "free space planning" driving models. For instance, such driving models may be stored in memory 130. For example, computing device 110 may be operable to control vehicle 100 using forward motion planning when driving along a road, and to control vehicle 100 using free space planning when adjusting vehicle position inside a driveway. As such, memory 130 may store a different set of driving rules for free space planning as for forward motion planning. For example, free space planning may include rules such as lower speed, greater clearance distance from objects, and more complicated maneuvers (such as multi-point turns) than forward motion planning.

Navigation system 168 may be used by computing device 110 in order to determine and follow a route to a location. In this regard, the navigation system 168 and/or data 134 may store map information, e.g., highly detailed maps that computing device 110 can use to navigate or control the vehicle. As an example, these maps may identify the shape and elevation of roadways, lane markers, intersections, crosswalks, speed limits, traffic signal lights, buildings, signs, real time or historical traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line. As noted above, the map information may store known traffic or congestion information and/or and transit schedules (train, bus, etc.) from a particular pickup or drop-off location at similar times in the past. This information may even be updated in real time by information received by the computing device 110.

Figure 2:
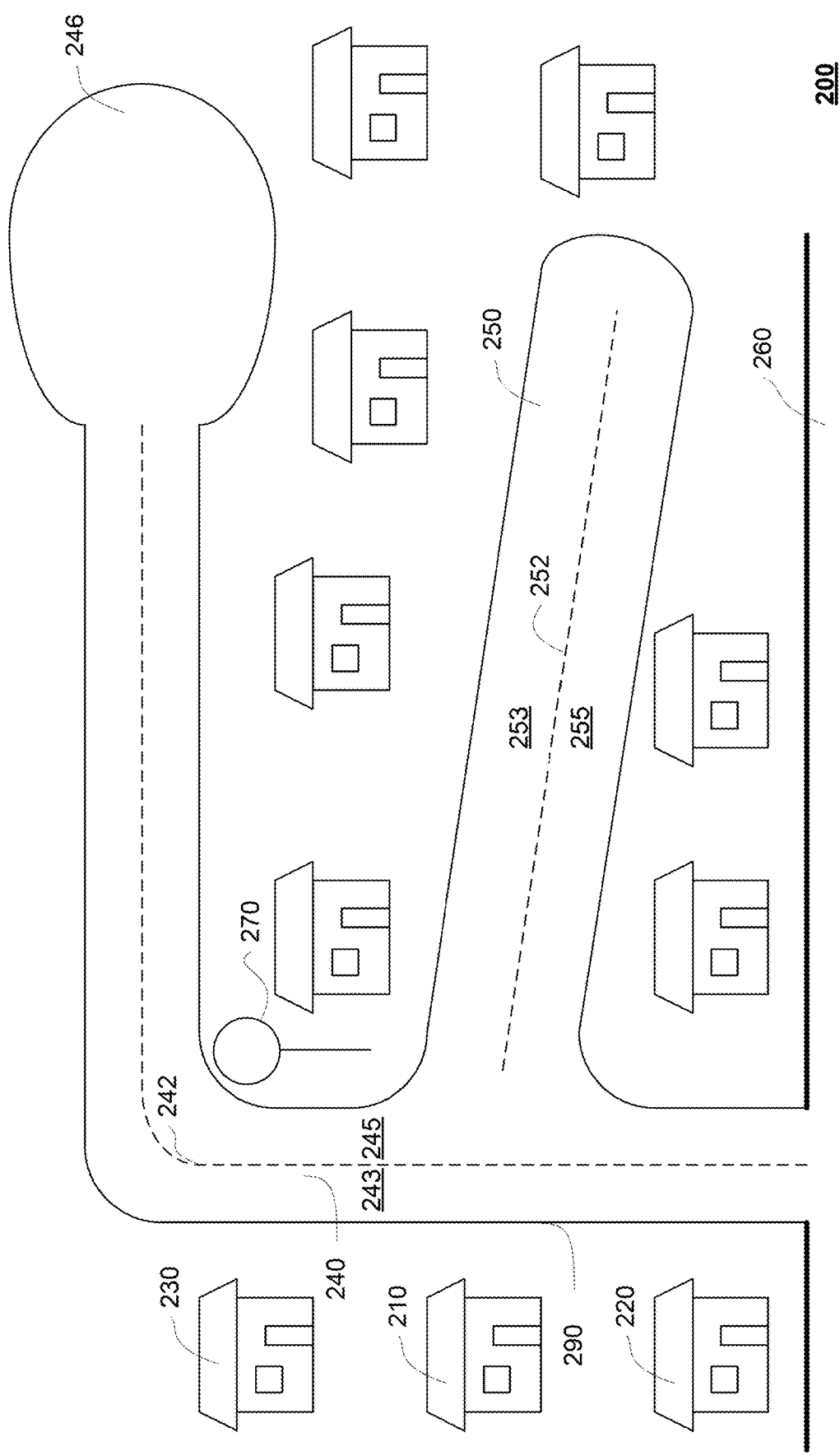
FIG. 2 is an example representation of map information in accordance with aspects of the disclosure.

FIG. 2 is an example map information 200 including a location 210. For this example, map information 200 depicts a portion of the map information that includes information identifying a type of the location 210. For example, the type of the location 210 may be a house, apartment building, school, airport, train station, stadium, school, church, etc. In this regard, the type of the location 210 may be collected from administrative records, such as county records, or manually labeled by a human operator (e.g., by reviewing aerial or street view images, or other sources of data associated with the location). Map information 200 may further include information identifying a type of area in which location 210 is located, which may be collected from administrative records or manually labeled by a human operator. For example, location 210 may be identified as being in a residential area or a commercial area.

Map information 200 may include information about infrastructure available around the location 210. For example, map information 200 may include information on locations nearby location 210, such as locations 220 and 230 adjacent to location 210 on a same side of road 240. Map information 200 may further include location types for locations nearby location 210, such as locations 220 and 230.

As shown, map information 200 includes the shape, location, and other characteristics of road 240, road 250, and road 260 around the location 210. For example, map information 200 may include an indication that each of roads 240, 250, and 260 has two way traffic. For another example, map information 200 may include lane marker or lane line 242 for road 240, and lane line 252 for road 250. The lane lines may also define various lanes, such as lanes 243, 245, 253, and 255. As alternative to lane lines or markers, lanes may also be inferred by the width of a road. Map information 200 may further include width, length, curvature, and/or shape for each of lanes 243, 245, 253, and 255. Map information 200 may also include information that identifies the direction of traffic and speed limits for each lane as well as information that allows the computing device 110 to determine whether the vehicle has the right of way to complete a particular type of maneuver (i.e. complete a turn, cross a lane of traffic or intersection, etc.).

Map information 200 may include relational information of the various roads and lanes. For example, map information 200 may indicate that road 240 intersects road 250. Map information 200 may indicate that road 240 has one end that connects to a cul-de-sac 246, and include dimensions and shapes of the cul-de-sac 246. Map information 200 may further indicate that road 240 has another end that connects to road 260, and include dimensions and shapes of the road 260. For example, map information 200 may indicate that road 260 is a major road with higher traffic volume (for example as indicated by width, number of lanes, or a higher speed limit) than road 240.

In addition to these features, map information 200 may further include signs and markings on the roads at or near the location 210 with various characteristics and different semantic meanings. As shown, map information 200 includes sign 270. For example, sign 270 may be a speed limit sign, a stop sign, a pedestrian walk sign, etc. Map information 200 may additionally include other features such as curbs (for example curb 290), waterways, vegetation, etc.

Map information 200 may also store predetermined stopping areas including driveways and parking lots. FIGS. 3A and 3B illustrate examples of driveway information 300A and 300B that may be included in map information 200. For ease of illustration, FIGS. 3A and 3B show example portions of map information 200 of FIG. 2. In this regard, the features in FIGS. 3A and 3B may generally correspond to the shape, location, and other characteristics of features shown in map information 200 of FIG. 2. For instance, location 210A in FIG. 3A and location 210B in FIG. 3B both may correspond to location 210 in FIG. 2, lane 243A in FIG. 3A and lane 243B in FIG. 3B both correspond to lane 243 in FIG. 2, etc. The driveway information 300A and 300B may be identified manually by a human operator or learned by a computing device over time, as discussed in detail below with respect to example methods.

Referring to FIG. 3A, driveway information 300A may be included with map information 200. Driveway information 300A shows location 210A and two nearby locations 220A and 230A adjacent to location 210A on the same side of road 240A. Driveway information 300A may include that the locations 210A, 220A, and 230A are houses in a residential area, for example as indicated by administrative records or by signs such as speed sign 270A indicating a low speed limit of 20 miles/hour.

Driveway 212A is shown in front of location 210A and driveway 232A is shown in front of location 230A. Since driveways appropriate for picking up and/or dropping off passengers are typically at or near an entrance of a location, driveway information 300A may additionally store locations of entrances and/or exits for the locations. For example, driveway 212A is shown leading to entrance 211A and garage 213A of location 210A, while driveway 232A is shown having a portion next to entrance 231A and garage 233A of location 230A. For another example, driveway information 300A may indicate that location 220A has entrance 221A, but does not to have a garage or a driveway.

Driveway information 300A may further include dimensions and shapes of the driveways. For example, driveway information 300A may include width, length, and curvature of each driveway 212A and 232A. Driveway information 300A may also include relational information of the driveways. For example, driveway information 300A may include that driveway 212A has one end connected to lane 243A of road 240A, while driveway 232A has two ends connected to lane 243A of road 240A.

Driveway information 300A may further include lot boundaries for each location. For example, driveway information 300A includes that location 210A is bounded by lot boundaries 214A, location 220A is bounded by lot boundaries 224A, and location 230A is bounded by lot boundaries 234A. These lot boundaries may be obtained from county records and aerial images, as discussed below with respect to example methods. As such, driveway information 300A may include which lot each driveway belongs to. For example, driveway information 300A may include that driveway 212A, being within the same boundaries 214A as location 210A, belongs to location 210A. For another example, driveway information 300A may include that driveway 232A, being within the same boundaries 234A as location 230A, belongs to location 230A.

As noted above, FIG. 3B includes driveway information 300B that may be included with map information 200. Driveway information 300B shows location 210B and nearby location 230B adjacent to location 210B on the same side of road 240B. Driveway information 300B may include that the locations 210B and 230B are office buildings in a commercial area, for example as indicated by administrative records or by signs such as speed sign 270B indicating a high speed limit of 60 miles/hour.

Driveways 212B and 216B are shown near location 210B, while driveway 232B is shown near location 230B. Since driveways appropriate for pickup and/or drop-off are typically at or near an entrance of a location, driveway information 300B may additionally store locations of entrances and/or exits for the locations. For example, driveway 212B is shown in front of location 210B and leading to entrance 211B. Driveway 216B is shown on the left side of location 210B leading to parking lot 217B. Driveway 232B is shown in front of location 230B and have portions next to both entrance 231B and entrance 235B.

Driveway information 300B may further include width, length, and curvature of each driveway 212B, 216B, and 232B. Driveway information 300B may also include relational information of the driveways. For example, driveway information 300B may include that driveway 212B has one end connected to lane 243B of road 240B, but is shaped as a cul-de-sac such that a vehicle can enter, make a turn, and exit from the same end of driveway 212B back to lane 243B. Driveway information 300B may include that driveway 216B has one end connected to lane 243B of road 240B and another end connected to parking lot 217B, such that a vehicle can enter, make a turn in the parking lot 217B, and exit from the same end of driveway 216B back to lane 243B. Driveway information 300B may also include that driveway 232B is configured as a pull-out lane next to lane 243B of road 240B, such that a vehicle may simply change lanes in order to enter or exit driveway 232B.

Driveway information 300B may include lot boundaries for each location. For example, driveway information 300B includes that location 210B is bounded by lot boundaries 214B, and location 230B is bounded by lot boundaries 234B. These lot boundaries may be obtained from county records and aerial images, as discussed below with respect to example methods. As such, driveway information 300B may include which lot each driveway belongs to. For example, driveway information 300B may include that driveways 212B and 216B, being within the same boundaries 214B as location 210B, belongs to location 210B. For another example, driveway information 300B may include that driveway 232B, being within the same boundaries 234B as location 230B, belongs to location 230B.

Although not shown in FIG. 2, map information 200 may further include GPS coordinates (not shown) of the location 210, location 220, location 230, and various other infrastructure at the location 210 as described above, such as roads 240, 250, 260, lane markers 242 and 252, lanes 243, 245, 253, 255, cul-de-sac 246, sign 270, and curb 290. Map information 200 may further include GPS coordinates (not shown) of various infrastructure included in driveway information 300A or 300B, such as locations 210A, 220A, 230A, 210B, 230B, lane markers 242A, 242B, lanes 243A, 245A, 243B, 245B, speed signs 270A, 270B, driveways 212A, 232A, 212B, 216B, 232B, lot boundaries 214A, 224A, 234A, 214B, 234B, entrances 211A, 221A, 231A, 211B, 231B, 235B, garages 213A, 233A, parking lot 217B.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing device 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent for further processing to the computing device 110 periodically and continuously as it is generated by the perception system 172. As discussed in further detail below, computing device 110 may use the positioning system 170 to determine the vehicle's location and perception system 172 to detect and respond to objects when needed to reach the location safely.

Figure 4:
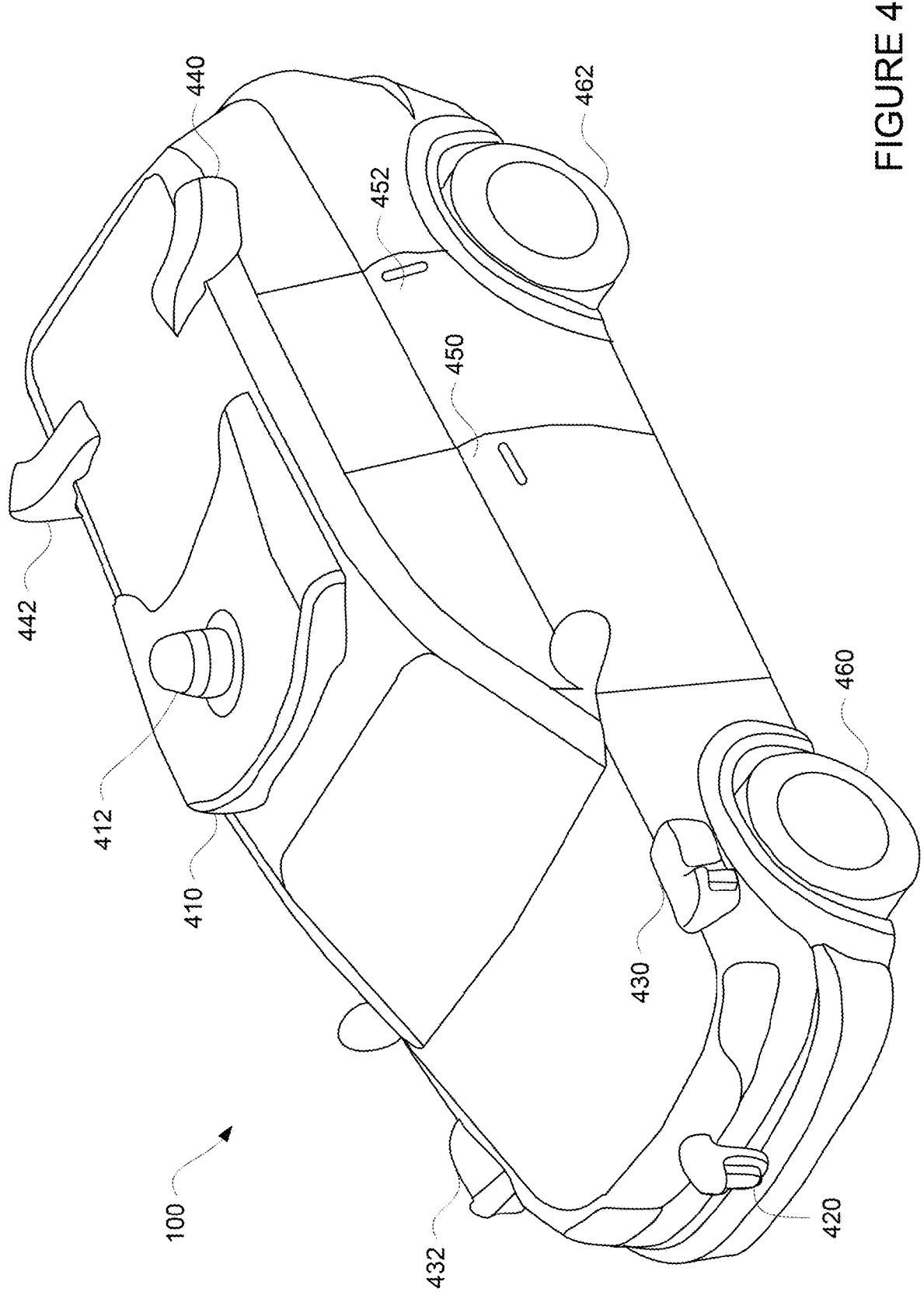
FIG. 4 is an example external view of a vehicle in accordance with aspects of the disclosure.

For instance, FIG. 4 is an example external view of vehicle 100. In this example, roof-top housing 410 and dome housing 412 may include a LIDAR sensor as well as various cameras and radar units. In addition, housing 420 located at the front end of vehicle 100 and housings 430, 432 on the driver's and passenger's sides of the vehicle may each store a LIDAR sensor. For example, housing 430 is located in front of door 450. Vehicle 100 also includes housings 440, 442 for radar units and/or cameras also located on the roof of vehicle 100. Additional radar units and cameras (not shown) may be located at the front and rear ends of vehicle 100 and/or on other positions along the roof or roof-top housing 410. Vehicle 100 also includes many features of a typical passenger vehicle such as doors 450, 452, wheels 460, 462, etc.

Once a nearby object is detected, computing device 110 and/or perception system 172 may determine the object's type, for example, a traffic cone, pedestrian, a vehicle (such as a passenger car, truck, bus, etc.), bicycle, etc. Objects may be identified by various models which may consider various characteristics of the detected objects, such as the size of an object, the speed of the object (bicycles do not tend to go faster than 40 miles per hour or slower than 0.1 miles per hour), the heat coming from the bicycle (bicycles tend to have rider that emit heat from their bodies), etc. In addition, the object may be classified based on specific attributes of the object, such as information contained on a license plate, bumper sticker, or logos that appear on the vehicle.

Memory 130 may store various models used by computing device 110 to make determinations on how to control the vehicle 100. For example, memory 130 may store one or more difficulty scoring models for assigning difficulty scores to various maneuvers that can be performed by vehicle 100 under different road and/or traffic conditions. For another example, memory 130 may store one or more driveway models trained to recognize available driveways from sensor data.

Figure 5:
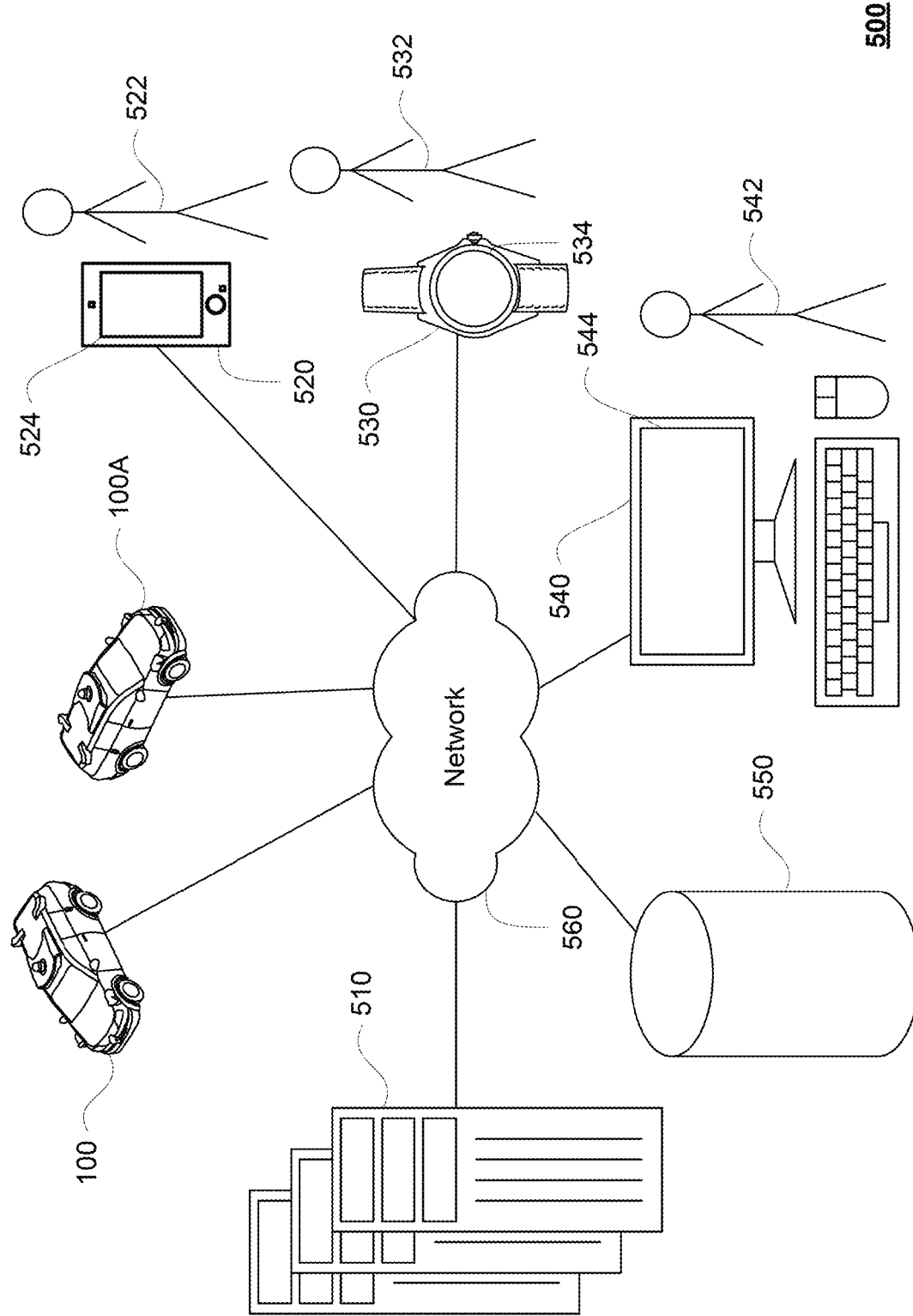
FIG. 5 is an example pictorial diagram of a system in accordance with aspects of the disclosure.
Figure 6:
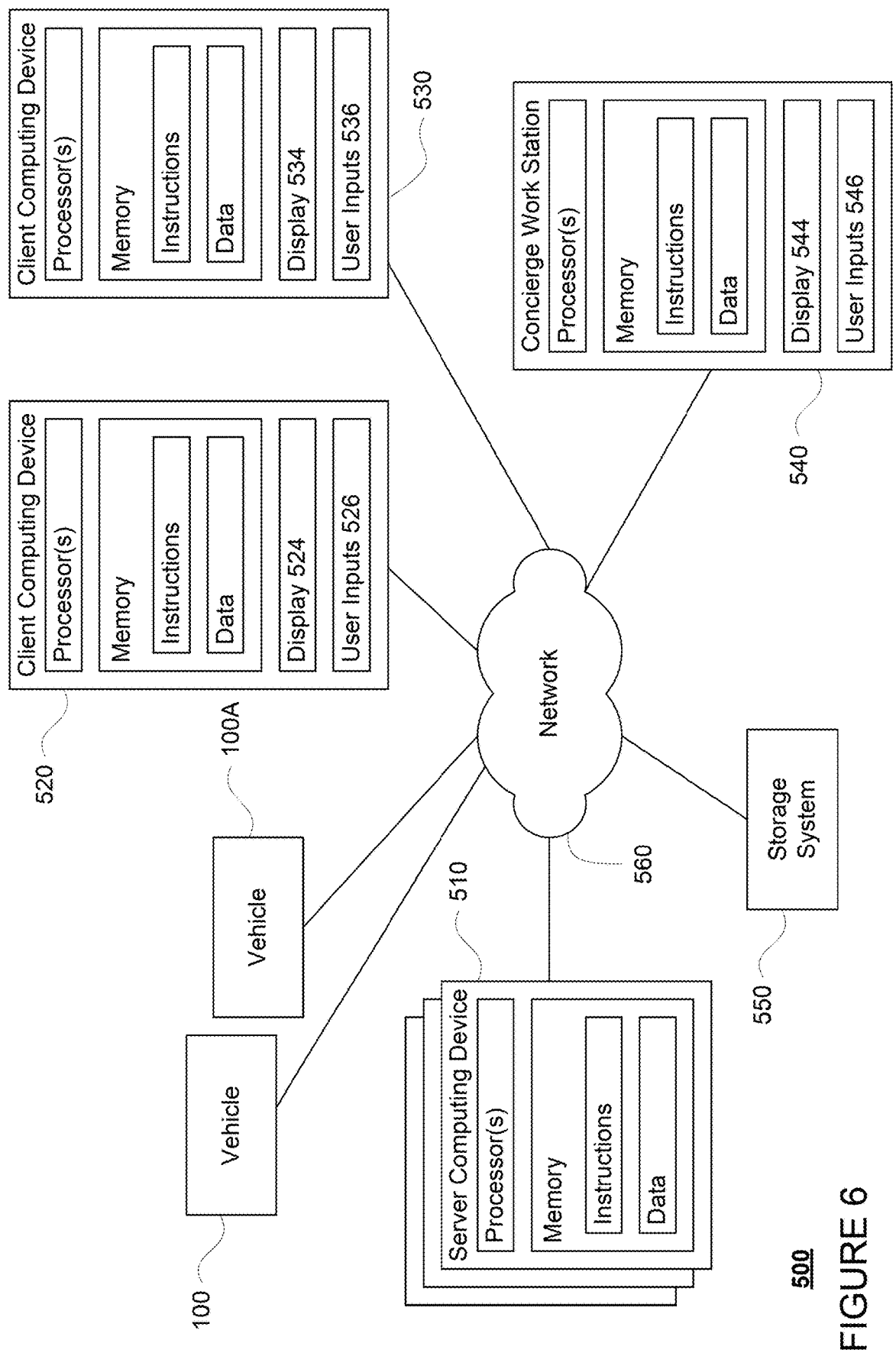
FIG. 6 is an example functional diagram of a system in accordance with aspects of the disclosure.

The one or more computing device 110 of vehicle 100 may also receive or transfer information to and from other computing devices, for instance using wireless network connections 156. The wireless network connections may include, for instance, BLUETOOTH®, Bluetooth LE, LTE, cellular, near field communications, etc. and various combinations of the foregoing. FIGS. 5 and 6 are pictorial and functional diagrams, respectively, of an example system 500 that includes a plurality of computing devices 510, 520, 530, 540 and a storage system 550 connected via a network 560. System 500 also includes vehicle 100, and vehicle 100A which may be configured similarly to vehicle 100. Although only a few vehicles and computing devices are depicted for simplicity, a typical system may include significantly more.

As shown in FIG. 5, each of computing devices 510, 520, 530, 540 may include one or more processors, memory, data and instructions. Such processors, memories, data and instructions may be configured similarly to one or more processors 120, memory 130, data 134, and instructions 132 of computing device 110.

The network 560, and intervening nodes, may include various configurations and protocols including short range communication protocols such as BLUETOOTH®, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 510 may include a server having a plurality of computing devices, e.g., a load balanced server farm, that exchange information with different nodes of a network for the purpose of receiving, processing and transmitting the data to and from other computing devices. For instance, one or more computing devices 510 may include one or more server computing devices that are capable of communicating with one or more computing device 110 of vehicle 100 or a similar computing device of vehicle 100A as well as client computing devices 520, 530, 540 via the network 560. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing device 510 may use network 560 to transmit and present information to a user, such as user 522, 532, 542 on a display, such as displays 524, 534, 544 of computing devices 520, 530, 540. In this regard, computing devices 520, 530, 540 may be considered client computing devices.

As shown in FIG. 6, each client computing device 520, 530, 540 may be a personal computing device intended for use by a user 522, 532, 542, and have all of the components normally used in connection with a personal computing device including a one or more processors (e.g., a central processing unit (CPU)), memory (e.g., RAM and internal hard drives) storing data and instructions, a display such as displays 524, 534, 544 (e.g., a monitor having a screen, a touch-screen, a projector, a television, or other device that is operable to display information), and user input devices 526, 536, 546 (e.g., a mouse, keyboard, touchscreen or microphone). A user, such as user 522, 532, 542, may send information, such as pickup or drop-off instructions, to server computing device 510, using user input devices 526, 536, 546 of computing devices 520, 530, and 540. The client computing devices may also include a camera for recording video streams, speakers, a network interface device, and all of the components used for connecting these elements to one another.

Although the client computing devices 520, 530, and 540 may each include a full-sized personal computing device, they may alternatively include mobile computing devices capable of wirelessly exchanging data with a server over a network such as the Internet. By way of example only, client computing device 520 may be a mobile phone or a device such as a wireless-enabled PDA, a tablet PC, a wearable computing device or system, or a netbook that is capable of obtaining information via the Internet or other networks. In another example, client computing device 530 may be a wearable computing system, shown as a wrist watch in FIG. 5. As an example the user may input information using a small keyboard, a keypad, microphone, using visual signals with a camera, or a touch screen.

In some examples, client computing device 540 may be remote operator work station used by an administrator to provide remote operator services to users such as users 522 and 532. For example, a remote operator 542 may use the remote operator work station 540 to communicate via a telephone call or audio connection with users through their respective client computing devices and/or vehicles 100 or 100A in order to ensure the safe operation of vehicles 100 and 100A and the safety of the users as described in further detail below. Although only a single remote operator work station 540 is shown in FIGS. 5 and 6, any number of such work stations may be included in a typical system.

Storage system 550 may store various types of information as described in more detail below. This information may be retrieved or otherwise accessed by a server computing device, such as one or more server computing devices 510, in order to perform some or all of the features described herein. For example, the information may include user account information such as credentials (e.g., a username and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as age information, health information, and user history information about how long it has taken the user to enter or exit vehicles in the past as discussed below.

The storage system 550 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

The storage system 550 may also store map information, such as map information 200. For instances, map information 200 may include driveway information, such as driveway information 300A or 300B.

The storage system 550 may further store various models for routing and controlling vehicle 100, such as object recognition models, difficulty scoring models, driveway models, driving models. In this regard, the storage system 550 may store data used for training some or all of these models. For example, storage system 550 may store aerial images for training objection recognition models, labeled sensor data (such as images or videos) of maneuvers for training difficulty scoring models, labeled sensor data (such as images or videos) of available driveways for training driveway models. Storage system 550 may store other data required for using these models, such as parameters and values.

The storage system 550 may also store information which can be provided to client computing devices for display to a user. For instance, the storage system 550 may store predetermined distance information for determining an area at which a vehicle is likely to stop for a given pickup or drop-off location. The storage system 550 may also store graphics, icons, and other items which may be displayed to a user as discussed below.

As with memory 130, storage system 550 can be of any type of computerized storage capable of storing information accessible by the server computing device 510, such as a hard-drive, memory card, ROM, RAM, DVD, CD-ROM, write-capable, and read-only memories. In addition, storage system 550 may include a distributed storage system where data is stored on a plurality of different storage devices which may be physically located at the same or different geographic locations. Storage system 550 may be connected to the computing devices via the network 560 as shown in FIG. 5 and/or may be directly connected to or incorporated into any of the computing device 110, 510, 520, 530, 540, etc.

Example Methods

In addition to the systems described above and illustrated in the figures, various operations will now be described. It should be understood that the following operations do not have to be performed in the precise order described below. Rather, various steps can be handled in a different order or simultaneously, and steps may also be added or omitted. In one aspect, a user may download an application for requesting a vehicle to a client computing device. For example, users 522 and 532 may download the application via a link in an email, directly from a website, or an application store to client computing devices 520 and 530. For example, client computing device may transmit a request for the application over the network, for example, to one or more server computing device 510, and in response, receive the application. The application may be installed locally at the client computing device.

The user may then use his or her client computing device to access the application and request a vehicle. As an example, a user such as user 532 may use client computing device 530 to send an instruction to one or more server computing devices 510 for a vehicle. As part of this, the user may identify a pickup location, a drop-off location, and, in some cases, one or more intermediate stopping locations anywhere within a service area where a vehicle can stop.

These pickup and drop-off locations may be predefined (e.g., specific addresses of residences or points of interest) or may simply be any location within a service area of the vehicles (e.g., defined by GPS coordinates). As an example, a pickup location can be defaulted to the current location of the user's client computing device, or can be input by the user at the user's client computing device. For instance, the user may enter an address or other location information or select a location on a map to select a pickup location. Once the user has selected one or more of a pickup and/or drop-off locations, such as location 210, the client computing device 520 may send the location or locations to one or more server computing devices of the centralized dispatching system.

In response, one or more server computing devices, such as server computing device 510, may select a vehicle, such as vehicle 100, for instance based on availability and proximity to the user. The server computing device 510 may then assign the user as the passenger for the vehicle 100, dispatch the selected vehicle (here vehicle 100) to pick up the assigned passenger. This may include by providing computing device 110 with the pickup and/or drop-off locations specified by the assigned passenger as well as information that can be used by the computing device 110 of vehicle 100 to authenticate the client computing device, such as client computing device 530.

Figure 7:
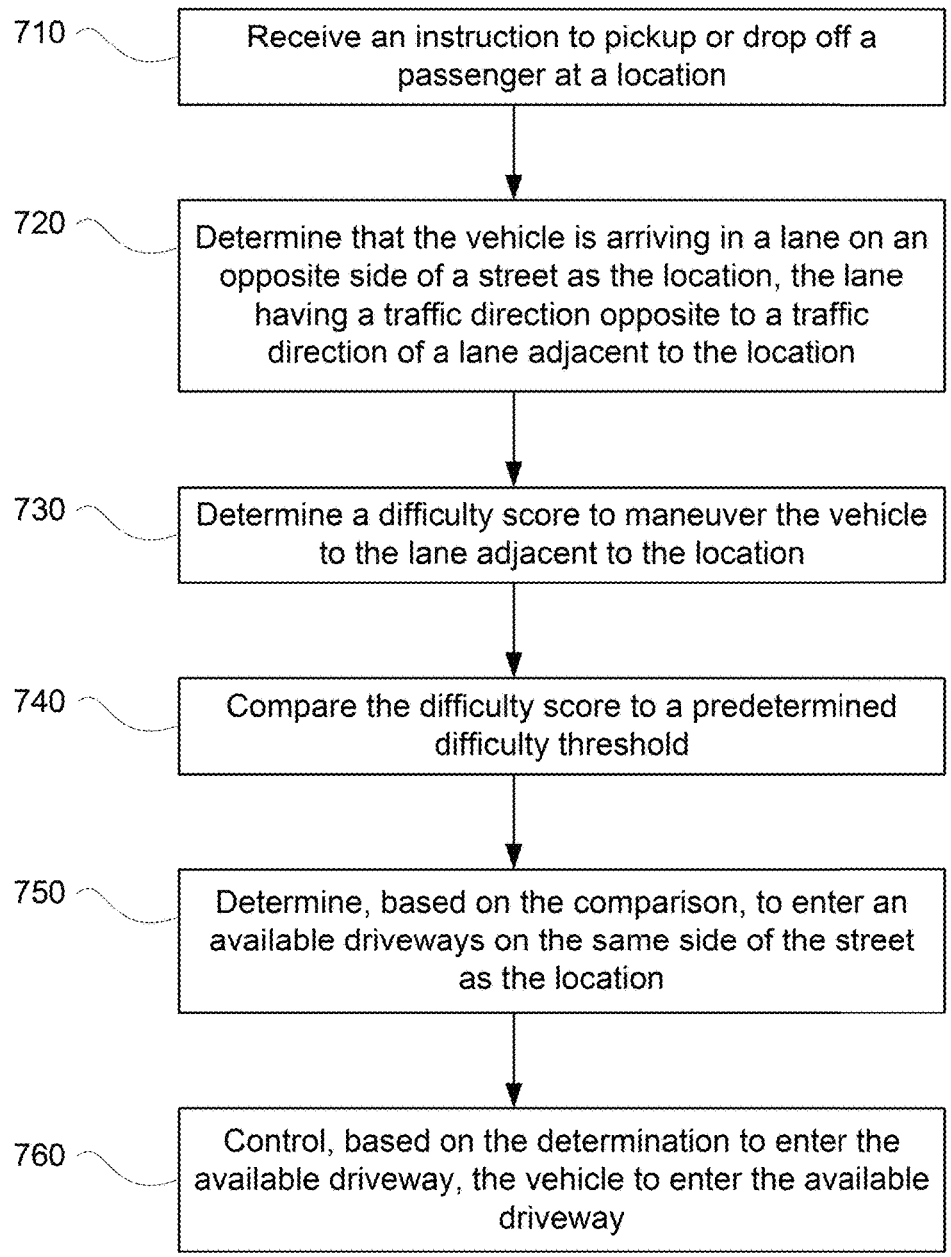
FIG. 7 is an example flow diagram in accordance with aspects of the disclosure.

FIG. 7 is an example flow diagram 700 that may be performed by one or more processors, such as one or more processors 120 of computing device 110. For example, processors 120 of computing device 110 may receive data and make various determinations as shown in flow diagram 700, and control the vehicle 100 based on these determinations. Referring to FIG. 7, in block 710, an instruction to pick up or drop off a passenger or cargo at a pickup or drop off spot at a location is received. In this regard, the computing device 110 may receive the instruction from the server computing device 510 as discussed above.

Thereafter, the computing device 110 may maneuver vehicle 100 towards the location. While doing so, the computing device 110 may receive sensor data from the perception system 172 in order to detect, identify and respond to objects including road users (vehicles, bicycles, and passengers), barriers, and signs.

In block 720, it is determined that the vehicle is arriving in a lane on an opposite side of a street as the location, the lane having a traffic direction opposite to a traffic direction of a lane adjacent to the location. For example, computing device 110 may determine this based on map information 200 from navigation system 168 and the route followed by vehicle 100.

Figure 8:
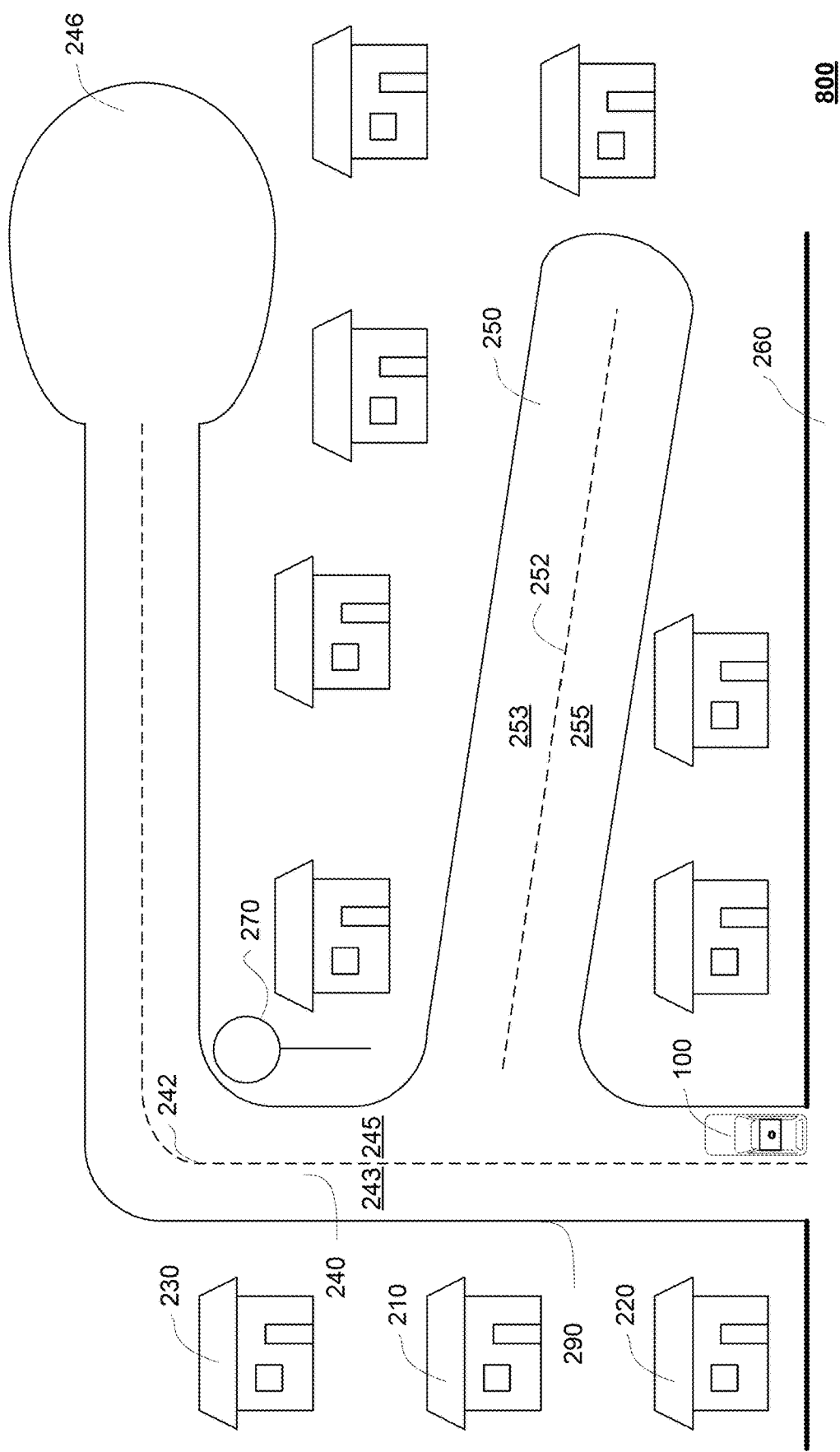

FIG. 8 illustrates an example situation 800 for determining that the vehicle 100 is arriving in a lane on an opposite side of a street as the pickup or drop-off location. Various features in FIG. 8 may generally correspond to the shape, location, and other characteristics of features shown in map information 200 of FIG. 2, and labeled as such. Additional features in FIG. 8, including various road users and other objects, are described in detail below. Although these examples are useful for demonstration purposes, they should not be considered limiting.

As shown in FIG. 8, computing device 110 may determine that vehicle 100 is approaching pickup or drop-off location 210 from lane 245, which is on an opposite side of road 240 as location 210. This determination may be made based on a route calculated by the navigation system 168, for example such as a route that requires vehicle 100 to enter road 240 from road 260 through lane 245. Depending on whether the vehicle 100 follows or deviates from the calculated route, this determination may be confirmed or changed. However, once vehicle 100 enters lane 245, computing device 110 may conclude that vehicle 100 would arrive at location 210 in lane 245. Further, computing device 110 may determine that lane 245 has a traffic direction opposite to a traffic direction of lane 243, the lane adjacent to location 210.

As mentioned above, picking up or dropping off passengers across the street may cause inconvenience, as the passenger would have to cross the street to get into the vehicle or to reach the destination. However, maneuvering the vehicle to the same side of the street as the pickup or drop-off location could cause other inconveniences to the passenger, such as incurring additional trip duration or distance. As such, a cost analysis may be performed for picking up or dropping off the passenger on each side of the street, before determining whether the vehicle should maneuver to the same side of the street as the pickup or drop-off location.

In this regard, the cost analysis may include determining a first convenience cost for the passenger for picking up or dropping off the passenger on the opposite side of the street, and determining a second convenience cost for the passenger for picking up or dropping off the passenger on the same side of the street. From these convenience costs, the computing devices may determine whether the vehicle should maneuver to the same side of the street as the pickup or drop-off location before performing the pickup or drop-off. For instance, referring to FIG. 8, if vehicle 100 is picking up a passenger at location 210 for a trip whose route requires vehicle 100 to exit road 240 and enter road 260, vehicle 100 may perform the pickup in either lane 245 or lane 243. A first convenience cost for the passenger may be determined for picking up the passenger in lane 245, which may be based on the time, effort, danger, and other factors relating to the passenger crossing road 240 to get into vehicle 100, as well as the possible additional trip duration and distance that may be incurred after vehicle 100 picks up the passenger and maneuvers from lane 245 to lane 243 in order to continue on the trip. A second convenience cost to the passenger may be determined for picking up the passenger in lane 243, which may be based on the fact that the passenger does not need to cross road 240 in order to get into vehicle 100, and the possible reduction in trip duration or distance incurred after vehicle 100 picks up the passenger in lane 243, since vehicle 100 may simply continue in lane 243 to enter road 260. Factors in favor or against the passenger having to cross road 240 may be determined based on specifics of road 240, such as width and number of lanes, whether there is a pedestrian crossing, volume of traffic, etc.

Computing device 110 may then compare the first convenience cost for picking up the passenger on the opposite side of the street as the pickup location 210 in lane 245 with the second convenience cost for picking up the passenger on the same side of the street as the pickup location 210 in lane 243. In some instances, if it is determined that the first convenience cost is higher than the second convenience cost, if the difference between the two costs meets or exceed a certain threshold, or if another criterion is met (e.g., a single factor may be enough, such as a danger level for crossing a street or a necessity to maneuver to a side of the street to complete the trip or exit the neighborhood). For example, if computing device 110 determines that the first convenience cost for picking up the passenger on the opposite side of the street as the pickup location 210 in lane 245 is higher than the second convenience cost for picking up the passenger on the same side of the street as the pickup location 210 in lane 243 or if the difference in the two convenience costs meets or exceeds a threshold, and/or if crossing road 240 has a certain danger level, and/or if there is a necessity to maneuver to the same side of the street in lane 243 in order to continue on the requested trip, computing device 110 may determine to maneuver vehicle 100 to the same side of the street as the pickup location 210 in lane 243 before performing the pickup.

As another example, referring again to FIG. 8, if vehicle 100 is dropping off a passenger at location 210, again vehicle 100 may perform the drop-off in either lane 245 or lane 243. A first convenience cost to the passenger may be determined for dropping off the passenger in lane 245, which may be based on the time and effort required for the passenger to cross road 240 to get to location 210. A second convenience cost to the passenger may be determined for dropping off the passenger in lane 243, which may be based on the additional trip duration or distance incurred as the vehicle 100 maneuvers from lane 245 to lane 243 before dropping off the passenger in lane 243.

Computing device 110 may then compare the first convenience cost for dropping off the passenger on the opposite side of the street as the drop-off location 210 in lane 245 with the second convenience cost for dropping off the passenger on the same side of the street as the drop-off location 210 in lane 243. In some instances, if it is determined that the first convenience cost is lower than the second convenience cost, or the difference between two costs does not meet a predetermined threshold and no other triggers requiring pick-up or drop-off on the same side of street as the location (such as the danger level for crossing the street or the necessity to maneuver the side of the street to complete the trip or to start a next trip), computing device 110 may determine to perform the drop-off on the opposite side of the street as the drop-off location 210 in lane 245.

If it is determined that vehicle 100 should maneuver to a lane on the same side of the street as the pickup or drop-off location to perform a pickup or drop-off, for example based on the comparison of convenience scores as described above, computing device 110 may evaluate the difficulty of performing such a maneuver. Referring back to FIG. 7, in block 730, a difficulty score to maneuver the vehicle to the lane adjacent to the location is determined.

For example, computing device 110 may be operable to assign a difficulty score to various maneuvers that can be performed by the vehicle 100 based on map information 200 provided by navigation system 168 and sensor data provided by perception system 172. For example, computing device 110 may be operable to assign a difficulty score to a maneuver based on a type of the maneuvers, such as U-turns, three-point turns, left turn, right turn, etc. For another example, computing device 110 may be operable to assign a difficulty score to a maneuver based on the shapes and dimensions of the road or roads on which the maneuver is to be performed, such as width, length, and curvature. For still another example, computing device 110 may be operable to assign a difficulty score to a maneuver based on determining from sensor data whether performing the maneuver would block traffic. For yet another example, computing device 110 may be operable to assign a difficulty score to a maneuver based on an estimated time to complete the maneuver.

Further, computing device 110 may be operable to combine these difficulty scores assigned to a given maneuver, for instance by performing a linear sum, to obtain an overall difficulty score for the maneuver.

Alternatively, one or more difficulty scoring models may be trained to assign difficulty scores to maneuvers based on map information from navigation system and conditions detected from sensor data. Such a difficulty scoring model may be trained using map information from navigation system 168 and sensor data generated by perception system 172 that are labeled with difficulty scores for various maneuvers performed at different roads with different traffic patterns. These labels may be generated, for instance, based on determinations manually made by remote operators. The sensor data may include all of the data generated by the perception system 172 during a maneuver, or more streamlined information, such as dimensions and shapes of the road on which a maneuver is performed, the pose, velocity, acceleration and similar data for other road users also on the road where the maneuver is performed. The difficulty models may include machine learning models, such as a deep neural network.

Figure 9A:
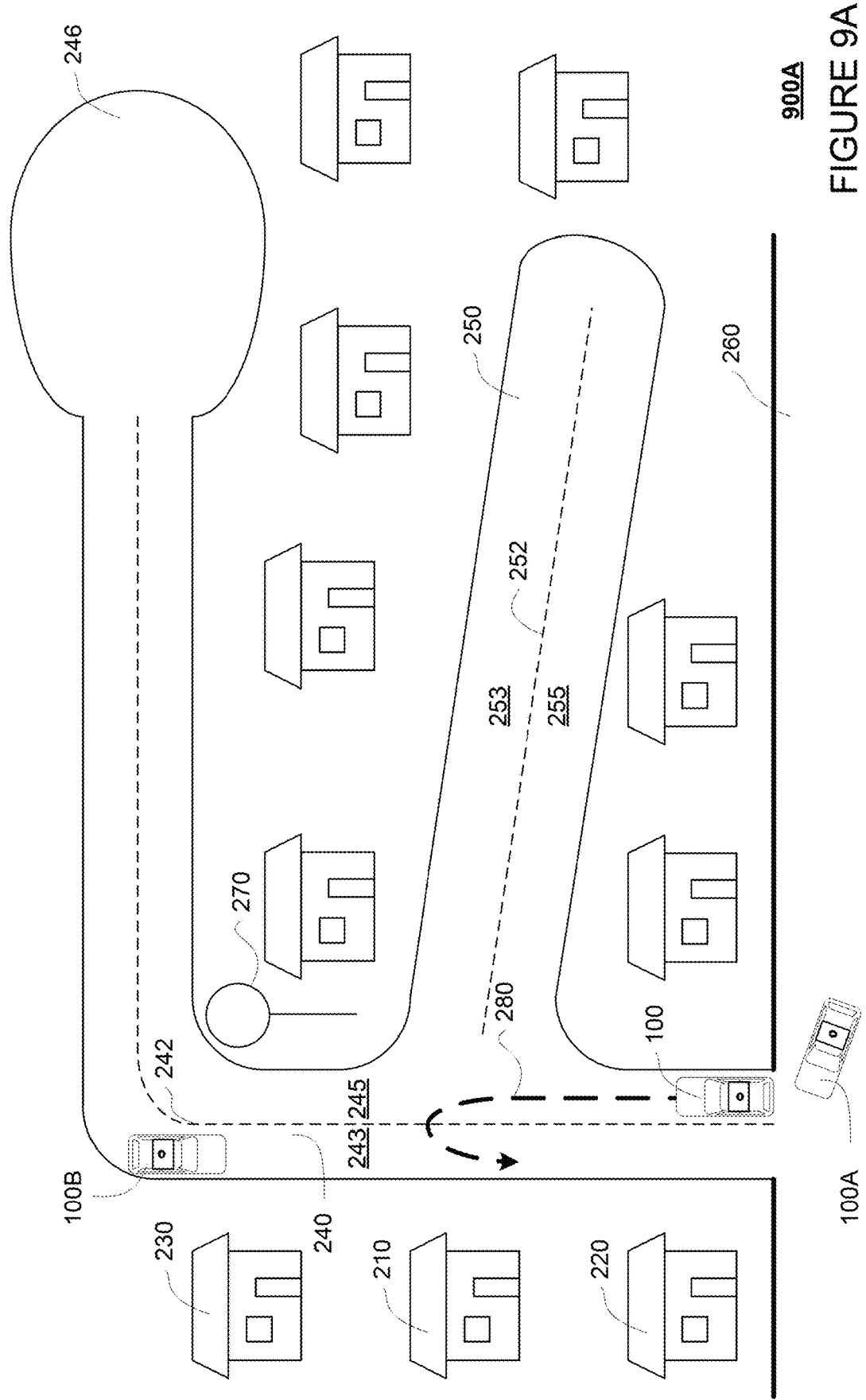
Figure 9B:
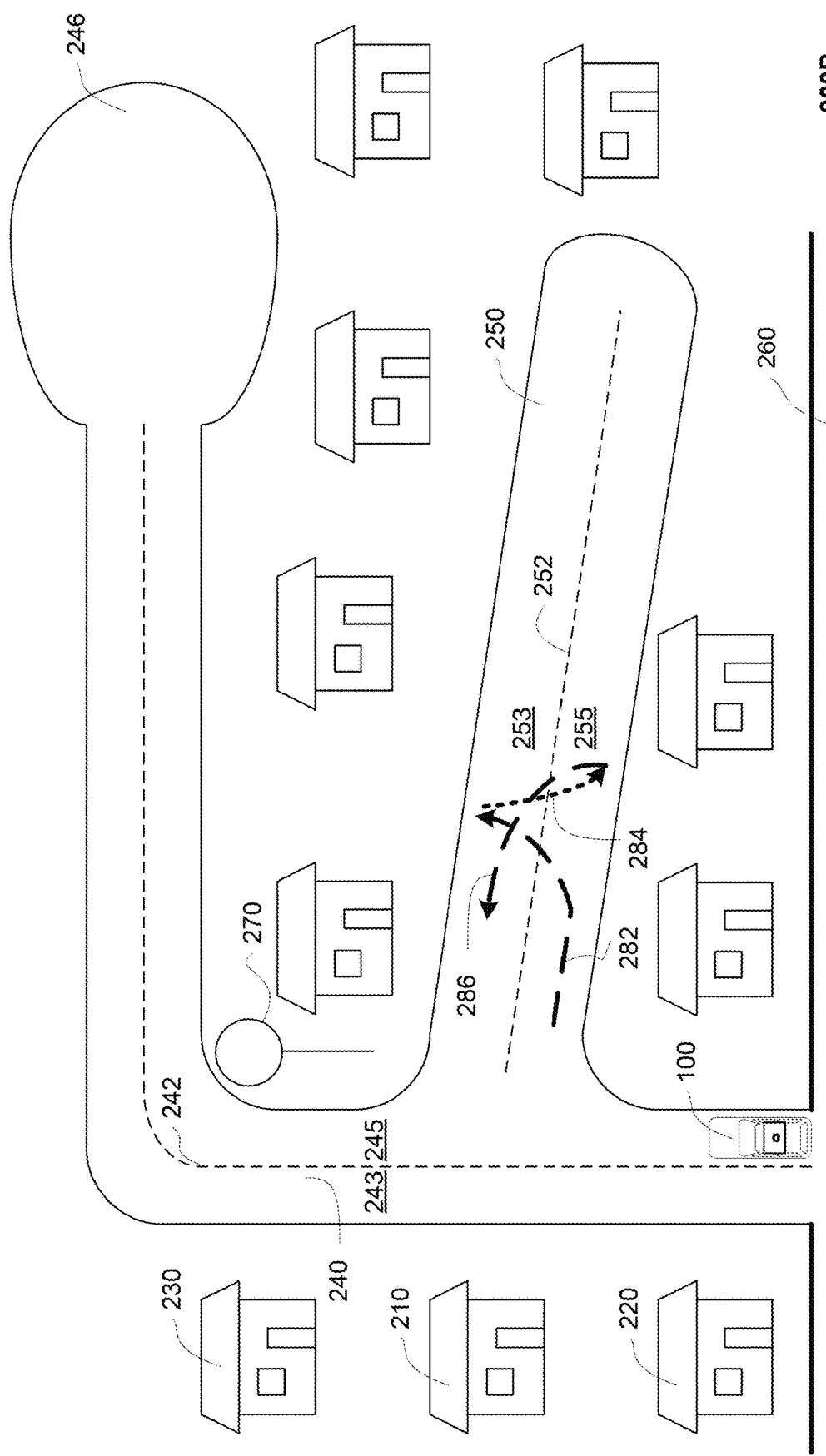

FIGS. 9A, 9B, and 9C respectively illustrate example situations 900A, 900B, and 900C for which a difficulty score may be determined and assigned. The difficulty scores in these example situations may be assigned by computing device 110, for instance using the aforementioned difficulty scoring model. Various features in FIGS. 9A, 9B, and 9C may generally correspond to the shape, location, and other characteristics of features shown in map information 200 of FIG. 2, and are labeled as such. Additional features in FIGS. 9A, 9B, and 9C, including various road users and other objects, are described in detail below. Although these examples are useful for demonstration purposes, they should not be considered limiting.

Referring to FIG. 9A, one way to maneuver vehicle 100 from lane 245 to lane 243 is to make a U-turn (indicated by arrow 280). As such, a first difficulty score may be assigned for a U-turn maneuver. As an example, a U-turn maneuver may have a difficulty score higher than a left turn but lower than a three-point turn.

Based on the dimensions and shapes of the road 240 on which the U-turn is to be performed, a second difficulty score may be assigned to the U-turn maneuver. For example, a higher difficulty score may be assigned for a narrower road than a wider road, and a higher difficulty score may be assigned for a curved road than a straight road, etc.

A third difficulty score may be assigned based on whether, by performing the U-turn maneuver, the vehicle 100 would be blocking ongoing traffic. For example, the sensor data may indicate that other users, such as cars and bicycles, are stopped behind the vehicle in the lane, or if they are driving around the vehicle in the lane. For example as shown, vehicle 100A is driving behind vehicle 100 in lane 245, and vehicle 100B is driving in lane 243. Thus, computing device 110 may determine that vehicle 100 would be blocking vehicle 100A during first part of the U-turn performed in lane 245 and blocking vehicle 100B during second part of the U-turn performed in lane 243. Computing device 110 may then assign a third difficulty score based on whether vehicle 100 would be blocking traffic. For example, the third difficulty score may be higher if the vehicle would be blocking traffic during the maneuver than if the vehicle would not be blocking traffic during the maneuver.

A fourth difficulty score may be assigned based on an extra wait time or trip duration incurred for the passenger by performing the U-turn maneuver. As such, computing device 110 may determine an amount of time required to perform the U-turn maneuver based on dimensions of the road 240 and traffic conditions, for example. Computing device 110 may then assign a fourth difficulty score based on the amount of time to perform the maneuver. For example, the fourth difficulty score may be a higher for a slower U-turn than a faster U-turn.

Computing device 110 may combine these difficulty scores, for instance, by performing a linear sum, to obtain an overall difficulty score for the U-turn maneuver. Alternatively, computing device 110 may extract the various factors from map information 200 and sensor data—maneuver type (U-turn), road geometries (dimensions and shapes of road 240), traffic pattern (position, speed, and heading of vehicles 100A and 100B), extra wait-time or trip duration, input these factors into a difficulty scoring model as described above, and obtain a difficulty score for the U-turn maneuver as an output from the difficulty scoring model.

Referring to FIG. 9B, another way to maneuver vehicle 100 from lane 245 to lane 243 is to make a three-point turn maneuver (indicated by arrows 282, 284, and 286). As shown in this example, vehicle 100 may make a right turn into lane 255, and perform the three-point turn maneuver on road 250. For example, computing device 110 may control vehicle 100 to perform certain maneuvers, such as a three-point turn maneuver, only on quiet roads where traffic volume is low (such as below a threshold). To perform the three-point turn maneuver, vehicle 100 may turn left from lane 255 into lane 253 against direction of traffic (dashed arrow 282), reverse (dotted arrow 284) back into lane 255 of road 250, and finally turning left into lane 253 (dashed arrow 286). Once driving in lane 253, vehicle 100 may make a left turn in order to perform pick up in lane 243. Further as shown, no vehicle is in either lane of road 250. Thus, computing device 110 may determine that vehicle 100 does not block traffic when performing the three-point turn maneuver. Computing device 110 may also determine an amount of time required to perform the three-point turn maneuver. Each of these determinations may then be used by computing device 110 in assigning difficult scores.

For instance, similarly as described for FIG. 9A, a first difficulty score may be assigned based on the maneuver being a three-point turn, a second difficulty score may be assigned based on the dimensions and shapes of the road 240 and road 250, a third difficulty score may be assigned based on that the vehicle 100 would be blocking traffic, and a fourth difficulty score may be assigned based on an estimated amount of time for completing the three-point turn maneuver under these conditions. Again, these difficulty scores may be combined, for instance by taking a linear sum, in order to obtain an overall difficulty score. Alternatively, computing device 110 may extract the various factors from map information 200 and sensor data—maneuver type (three-point turn), road geometries (dimensions and shapes of roads 240 and 250), traffic pattern (position, speed, and heading of vehicles, if any, on road 250), extra wait-time or trip duration, input these factors into the difficulty scoring model as described above, and obtain a difficulty score for the three-point turn maneuver as an output from the difficulty scoring model.

Referring to FIG. 9C, yet another way to maneuver vehicle 100 from lane 245 to lane 243 is to perform a drive-around maneuver (indicated by arrow 288). As shown, the drive-around includes driving along in lane 245 of road 240, including passing location 210 and making a right turn, to reach cul-de-sac 246, and then drive around cul-de-sac 246 and return in lane 243 back to location 210, including making a left turn. Further, since vehicle 100 is simply driving along traffic for this drive-around maneuver, the maneuver does not block traffic such as vehicle 100D. Computing device 110 may also determine an estimated time for completing the drive-around maneuver based on dimensions and shapes of road 240 and cul-de-sac 246. Each of these determinations may then be used by computing device 110 in assigning difficult scores.

For instance, similarly as described for FIG. 9A, a first difficulty score may be assigned based on the maneuver being a drive-around, a second difficulty score may be assigned based on the dimensions and shapes of the road 240 and cul-de-sac 246, a third difficulty score may be assigned based on that the vehicle 100 would not be blocking traffic, and a fourth difficulty score may be assigned based on an estimated amount of time for completing the drive-around maneuver under these conditions. Again, these difficulty scores may be combined, for instance by taking a linear sum, in order to obtain an overall difficulty score. Alternatively, computing device 110 may extract the various factors from map information 200 and sensor data—maneuver type (drive-around), road geometries (dimensions and shapes of road 240 and cul-de-sac 246), traffic pattern (position, speed, and heading of vehicle 100D), extra wait-time or trip duration, input these factors into a difficulty scoring model as described above, and obtain a difficulty score for the drive-around maneuver as an output from the difficulty scoring model.

Using the determined difficulty score, computing device 110 may evaluate whether it would be efficient or safe for vehicle 100 to perform the maneuver to position itself in the lane adjacent to the pickup or drop-off location, or to look for other ways to move to the same side of the street as the pickup or drop-off location, such as by entering an available driveway. For example, referring back to FIG. 7, in block 740, the difficulty score is compared to a predetermined difficulty score. Referring to FIGS. 9A, 9B, and 9C, computing device 110 may compare the difficulty scores for each of these maneuvers with a predetermined difficulty threshold. For example, the predetermined difficulty threshold may be selected and adjusted manually based on observing situations that would cause significant annoyance to other road users. As illustrated by FIGS. 9A–9C, when more than one maneuver is possible for maneuvering the vehicle to the adjacent lane on the same side of street as the pickup or drop-off location, the difficulty score of each potential maneuver may be compared to the predetermined difficulty threshold.

Then, in block 750, based on the comparison, it is determined to enter an available driveway on the same side of the street as the location. For example, computing device 110 may determine that the difficulty score for performing a maneuver to position the vehicle 100 in a lane adjacent the pickup or drop-off location is greater than the predetermined threshold, and determine to enter an available driveway on the same side of the street as the pickup or drop-off location to perform the pickup or drop-off.

In this regard, computing device 110 may access driveway information, such as driveway information 300A or 300B, from navigation system 168, as well as sensor data from perception system 172, in order to identify available driveways on the same side of the street as the pickup or drop-off location. FIG. 10 illustrates an example situation 1000 for which it is determined that driveways are available on a same side of the street as the pickup or drop-off location. Various features in FIG. 10 may generally correspond to the shape, location, and other characteristics of features shown in driveway information 300A of FIG. 3A, and are labeled as such. Additional features in FIG. 10, including various road users and other objects, are described in detail below. Although these examples are useful for demonstration purposes, they should not be considered limiting.

In some examples, the driveway information accessed by the computing device 110, such as driveway information 300A and 300B, may be gathered and prepared on a remote server such as server computing device 510, before being made available to the vehicle 100 on computing device 110. For instance, the server computing device 510 may retrieve or otherwise access lot boundary information describing various lots in an area from administrative sources, such as lot boundary maps from county records. The lot boundary maps may include information such as GPS coordinates of lot boundaries, shape and dimensions of the lot boundaries, ownership of the lot, the zoning type of the lot (such as residential or commercial), etc.

The server computing device 510 may also retrieve aerial images of an area, for example from one or more satellites via network 560. Various structures, such as buildings and road infrastructures, including driveways, may be labeled on the aerial images. The structures may be manually labeled by a human operator, or alternatively, an object recognition model may be trained on the server computing device 510 to recognize objects in aerial images.

For example, an object recognition model may be trained on server computing device 510 to draw polygons on aerial images. For example, polygons may be drawn around regions in an aerial image that have different color, brightness, intensity, or other visual aspect than the surroundings. A human operator may then label these polygons as various buildings and road infrastructures, including driveways, generating manually labeled aerial images. These manually labeled aerial images may then be used as input to train the object recognition model to identify buildings and structures from polygons drawn on aerial images. The object recognition models may include machine learning models, such as a deep neural network.

The labeled aerial images may be overlaid on the lot boundary maps obtained from country records. For example, the aerial images may be matched to lot boundary maps based on matching GPS coordinates. The server computing device 510 may then determine what structures belong in which lot, including the driveways, by determining which structures are inside which lot boundaries.

Further, the server computing device 510 may be operable to determine whether a lot is in a residential area, for instance from county records identifying zoning rules or restrictions and/or from other information such as speed signs of 25 miles per hour or under. For a lot in a residential area, the server computing device 510 may determine that a driveway belongs to the house within the same lot boundaries. For a lot including a point of interest such as a school or an apartment complex, there may be multiple driveways, and the server computing device 510 may determine that a driveway in front of an entrance as appropriate for pickup and drop off. These driveway information, once obtained at the server computing device 510, may be made available to computing device 110 of the vehicle 100, for example such as stored in navigation system 168 as part of driveway information 300A of map information 200.

Computing device 110 may use the driveway information to identify driveways located on the same side of the street as the pickup or drop-off location. As shown in FIG. 10, based on driveway information 300A, computing device 110 may determine that driveways 212A and 232A are located on same side of road 240A as location 210A. Computing device 110 may further determine that driveway 212A belongs to location 210A from the driveway information 300A, since driveway 212A is located within the same lot boundaries 214A as location 210A.

Next, the computing device 110 may determine whether there is sufficient space in the identified driveways to accommodate the vehicle 100. For instance, computing device 110 may determine based on sensor data that vehicle 100A is already parked in driveway 212A, and vehicle 100B is already parked in driveway 232A. As such, computing device 110 may determine, based on driveway information 300A including the dimensions and shapes of driveway 212A and 232A, sensor data indicating dimensions and positioning of vehicles 100A and 100B, whether there is enough remaining space in each of driveway 212A and 232A to accommodate vehicle 100.

As one approach, the computing devices 110 may determine whether there is sufficient space in the identified driveway for the vehicle 100 to park without the vehicle 100 blocking other vehicles within an adjacent lane. For example, computing device 110 may first determine a driving region 1010 of lane 243A adjacent to driveways 212A and 232A. As shown, the driving region 1010 may be determined to include a predetermined width in the lane 243A that can fit an average size vehicle, such as vehicle 100C, plus some predetermined buffer room, for example to accommodate particularly wide vehicles. The driving region 1010 may be a predetermined clearance distance away from lane markers and/or curbs, such as lane marker 242A and the curb 290A. In some examples, the predetermined clearance distance may be selected based on whether the road is in a residential area. For example, a greater clearance distance may be selected for a residential area since children may likely be playing near the curb, and properties such as trash cans may also be positioned near the curb. For another example, a smaller clearance distance may be selected for a residential area since large vehicles, such as trucks and buses are less likely to be driving in a residential area.

Next, computing device 110 may determine based on the dimensions of vehicle 100, dimensions of driveways 212A and 232A, and dimensions and positioning of objects already on the driveways 212A and 232A, whether there is room in driveways 212A and 232A to position the vehicle 100 such that a rear end of the vehicle 100 is outside of the driving region 1010. For example as shown, when entered into driveway 212A, vehicle 100 (shown as dotted) can position itself on a right side of vehicle 100A on driveway 212A such that a rear end of vehicle 100 is outside of driving region 1010 of lane 243A. Likewise, when entered into driveway 232A, vehicle 100 (shown as dotted) can position itself behind vehicle 100B on driveway 232A such that a rear end of vehicle 100 is outside of driving region 1010 of lane 243A. As such, vehicles driving in driving region 1010 would not need to deviate outside the driving region 1010 to avoid hitting vehicle 100 when vehicle 100 is pulled into either driveway 212A or 232A. As such, computing device 110 may determine that both driveways 212A and 232A are available.

Alternatively or additionally, one or more driveway models may be trained to identify available driveways from sensor data. As such, computing device 110 may input sensor data to the driveway model, and obtain output identifying any available driveways based on the sensor data. The driveway models may include machine learning models, such as a deep neural network. A driveway model may be trained by using sensor data generated by perception system 172 with labeled instances of when an available driveway is identified. These labels may be generated, for instance, based on the determinations manually made by remote operators. The sensor data may include all of the data generated by the perception system 172, or more streamlined information, such as the pose, velocity, acceleration and similar data for each road user and/or object detected by the perception system 172 on a driveway.

In cases where more than one driveway is determined to be available on the same side of the street as the pickup or drop-off location, computing device 110 may select one of the available driveways for vehicle 100 to enter. For example, as shown in FIG. 10, since both driveways 212A and 232A are determined to be available, computing device 110 may select one of them. In some examples, because driveway 212A is within the same lot boundaries 214A as pickup or drop-off location 210A, driveway 212A may be selected over driveway 232A. This may provide greater convenience for the passenger and avoid inconveniencing the passenger's neighbor. In other examples, the available driveway closest to an entrance of the pickup or drop-off location may be selected over other available driveways. For example, this may be driveway 212A shown in FIG. 10 closest to entrance 211A, or driveway 212B shown in FIG. 3B closest to entrance 211B (assuming determined to be available).

Once computing device 110 determines to enter an available driveway on the same side of the street as the pickup or drop-off location, referring back to FIG. 7, in block 760, the vehicle is controlled in an autonomous driving mode in order to enter the driveway. In this regard, computing device 110 may use the sensor data to detect, identify and respond to objects on the street as well as in the driveway.

Figure 11:
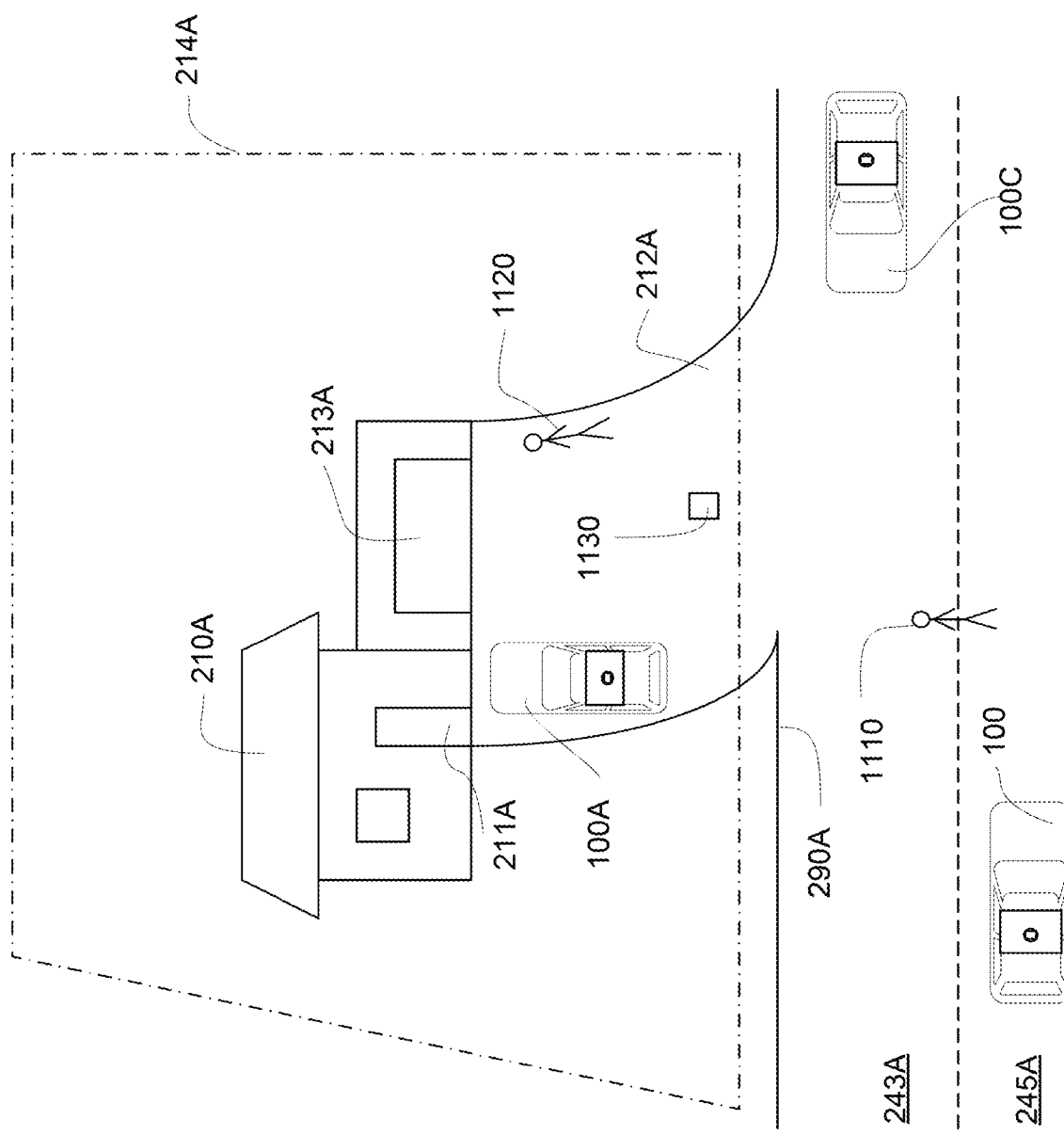

FIG. 11 illustrates an example situation 1100 of controlling vehicle 100 to enter driveway 212A. Various features in FIG. 11 may generally correspond to the shape, location, and other characteristics of features shown in driveway information 300A of FIG. 3A, and are labeled as such. Additional features in FIG. 11, including various road users and other objects, are described in detail below. Although these examples are useful for demonstration purposes, they should not be considered limiting. As shown, computing device 110 may detect vehicle 100C driving in lane 243A and pedestrian 1110 walking in lane 245A towards lane 243A from the sensor data of the perception system 172. Computing device 110 may respond by controlling vehicle 100 to wait for pedestrian 1110 to reach curb 290A and for vehicle 100C to drive past driveway 212A before pulling into driveway 212A.

Once vehicle 100C drives past driveway 212A and pedestrian reaches curb 290A, computing device 110 may control vehicle 100 to enter driveway 212A. At this point, computing device 110 may use the sensor data to detect parked vehicle 100A, pedestrian 1120, and a trash bag 1130 on driveway 212A. As such, computing device 110 may determine a position and angle to enter driveway 212A such that vehicle 100 does not hit vehicle 100A, pedestrian 1120, and trash bag 1130. For example, computing device 110 may control vehicle 100 to enter the space between vehicle 100A and trash bag 1130 or the space between pedestrian 1120 and trash bag 1130. In some examples, computing device 110 may select the space between vehicle 100A and trash bag 1130 over the space between the pedestrian 1120 and trash bag 1130, particularly if pedestrian 1120 is detected to be a child or moving.

To ensure safety as the vehicle 100 enters into the driveway 212A, computing device 110 may control the vehicle based on a number of predetermined rules. For example, the vehicle's computing devices may use "free space planning" behaviors to maneuver the vehicle to enter the driveway (such as multi-point turns and parallel parking), instead of "forward motion planning" behaviors (such as driving along a road). For another example, computing device 110 may decrease a speed of the vehicle 100 to below a predetermined threshold speed when entering the driveway 212A. This may improve vehicle's 100 response to sudden movements of children and pets. For still another example, computing device 110 may control the vehicle 100 to avoid objects on the driveway 212A by at least a predetermined clearance distance as the vehicle 100 enters the driveway 212A. This may prevent the vehicle 100 from damaging property left on the driveway 212A (such as parked vehicle 100A, tools, toys) or creating a mess (such as running over a trash bag 1130 or a pile of leaves). For yet another example, computing device 110 may determine a surface type of the driveway 212A from sensor data, such as paved or gravel, and control the vehicle 100 based on the surface type. For example, if the surface of the driveway 212A is gravel, on which it may be difficult to maneuver vehicle 100, computing device 110 may control vehicle 100 not enter too far into the driveway 212A, such as only enter enough to be outside a driving region of an adjacent lane.

Figure 12:
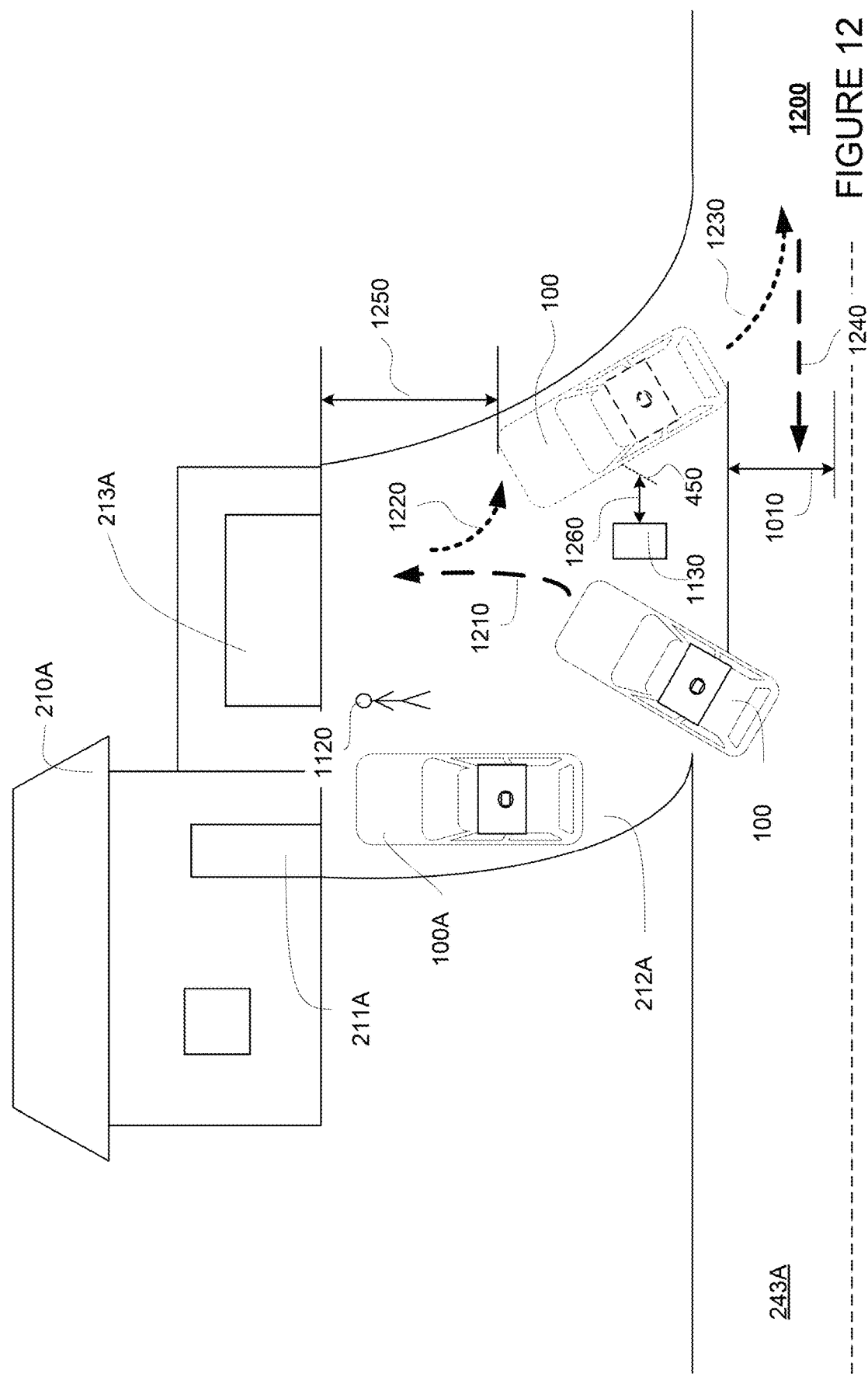

FIG. 12 illustrates an example situation 1200 for adjusting vehicle position inside a driveway for the convenience of the passenger and other road users. Various features in FIG. 12 may generally correspond to the shape, location, and other characteristics of features shown in driveway information 300A of FIG. 3A, and are labeled as such. Additional features in FIG. 12, including various road users and other objects, are described in detail below. Although these examples are useful for demonstration purposes, they should not be considered limiting.

Computing device 110 may control vehicle 100 to adjust its position inside the driveway according to a set of predetermined rules. For example, one predetermined rule may be to adjust a position of the vehicle so that the vehicle is outside a driving region of a lane adjacent to the driveway. For instance, as shown in FIG. 12 and discussed above in relation to FIG. 10, computing device 110 may determine a driving region 1010 of lane 243A based on sensor data, and adjust position of vehicle 100 in driveway 212A such that a rear end of vehicle 100 is outside of the driving region 1010.

As mentioned above, another example predetermined rule may be to use "free space planning" behaviors when maneuvering the vehicle 100 inside the driveway 212A. For example, computing device 110 may control vehicle 100 perform a multi-point turn—first pull farther into driveway 212A (indicated by dashed arrow 1210) and then reversing towards the right side of the driveway 212 (indicated by dotted arrow 1220). Another example predetermined rule may be to maintain a speed of vehicle 100 below a threshold speed while inside the driveway.

Still another predetermined rule may be to adjust a position of the vehicle so that the vehicle 100 maintains at least a predetermined clearance distance from objects on the driveway 212A. In order to do so, computing device 110 may continue to detect and respond to various road users and objects identified on the driveway 212A, including vehicle 100A, pedestrian 1120, and trash bag 1130. For example, this includes responding to movement of pedestrian 1120 as shown.

Yet another predetermined rule may be to adjust a position of the vehicle so that the vehicle 100 is at least a predetermined clearance distance from an entrance or a garage of the pickup or drop-off location. For example as shown, computing device 110 may adjust position of the vehicle 100 so that the vehicle 100 is at a predetermined clearance distance 1250 from garage 213A, this ensures that vehicle 100 is not pulled so far into the driveway 212A such that the vehicle 100 is blocking the garage 213A of the location 210A. Not pulling too far into the driveway 212A may further reduce the difficulty of the vehicle 100 when it exits the driveway 212A, particularly when the driveway 212A may have an uneven surface, such as dirt or gravel. As shown, after the multi-point turn indicated by arrows 1210 and 1220, vehicle 100 may simply exit driveway 212A by reversing into lane 243A (indicated by dotted arrow 1230) and then drive forward in lane 243A (indicated by dashed arrow 1240).

Yet another predetermined rule may be to adjust a position of the vehicle 100 such that a passenger door of the vehicle 100 can be opened with at least a predetermined clearance distance from objects on the driveway. For example as shown, after the maneuver indicated by arrows 1210 and 1220, passenger door 450 is a predetermined clearance distance 1260 away from trash bag 1130. This ensures that the passenger can easily get into and out of the vehicle 100.

Figure 13:
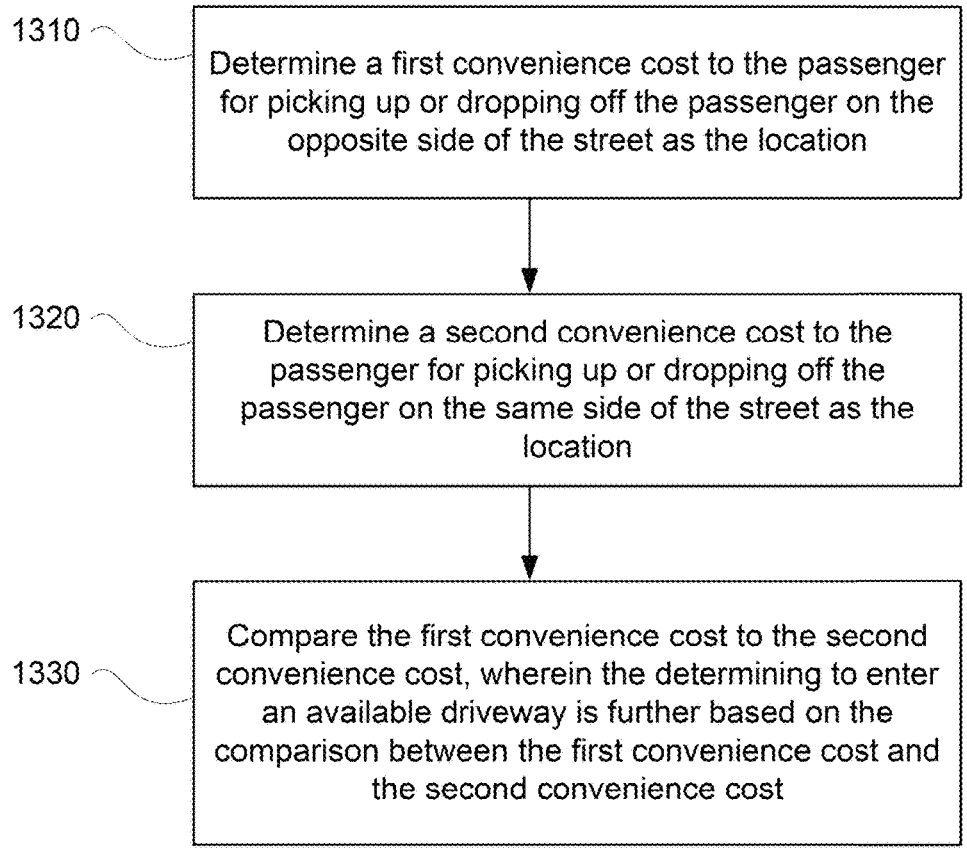
FIG. 13 is another example flow diagram in accordance with aspects of the disclosure.

FIG. 13 is another example flow diagram 1300 that may be performed by one or more processors, such as one or more processors 120 of computing device 110. For example, processors 120 of computing device 110 may receive data and make various determinations as shown in flow diagram 1300, and determine whether the vehicle 100 should enter an available driveway further based on these determinations. Referring to FIG. 13, in block 1310, a first convenience cost to the passenger for picking up or dropping off the passenger on the opposite side of the street as the location is determined. In block 1320, a second convenience cost to the passenger for picking up or dropping off the passenger on the same side of the street as the location is determined. In block 1330, the first convenience cost is compared to the second convenience cost, wherein the determining to enter an available driveway is further based on the comparison between the first convenience cost and the second convenience cost. For example, if it is determined that the first convenience cost is higher than the second convenience cost, or if the difference between the two costs meets a threshold, computing device 110 may determine to maneuver vehicle 100 to the same side of the street as the pickup location 210 in lane 243 before performing the pickup. In some instances, the determining to enter an available driveway may be further based on an additional criterion or factor, such as a danger level for crossing the street or a necessity to maneuver to the same side of the street to complete the trip or exit the neighborhood.

Again, the features described above may enable autonomous vehicles to make independent determinations whether to enter a driveway to perform a passenger pick-up or drop-off. This may improve passenger experience with autonomous vehicles, as the passenger may avoid having to cross the street, or to wait a long time. Further, by controlling the autonomous vehicle according to heightened safety rules while on the driveway, the autonomous vehicle may be more responsive to its environment and less likely to injure pedestrians or damage private property. In addition, by controlling the autonomous vehicle to position it clear from ongoing traffic and objects on the driveway, the autonomous vehicle may be less likely to block or inconvenience the passenger or other road users.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for maneuvering an autonomous vehicle to enter a driveway, comprising:
   receiving, by one or more processors, an instruction to pickup or drop off a passenger at a location;
   determining, by the one or more processors, that the vehicle is arriving in a lane on an opposite side of a street as the location, the lane having a traffic direction opposite to a traffic direction of a lane adjacent to the location;
   determining, by the one or more processors, a difficulty score for a maneuver for positioning the vehicle to the lane adjacent to the location, the difficulty score being a value representing difficulty of performing the maneuver;
   comparing, by the one or more processors, the difficulty score to a predetermined difficulty threshold;
   determining, by the one or more processors based on the comparison, to enter an available driveway on a same side of the street as the location; and
   controlling, by the one or more processors based on the determination to enter the available driveway, the vehicle to enter the available driveway.

2. The method of claim 1, further comprising:
   determining, by the one or more processors, an amount of time required to maneuver the vehicle to the lane adjacent to the location, wherein the determining the difficulty score is further based on the amount of time required to maneuver the vehicle.

3. The method of claim 1, further comprising:
   determining, by the one or more processors based on sensor data from a perception system, whether the vehicle is blocking traffic, wherein the determining the difficulty score is further based on whether the vehicle is blocking traffic.

4. The method of claim 1, wherein the difficult score is determined further based on dimensions of one or more roads on which the maneuver is to be performed.

5. The method of claim 1, wherein the determining to enter the available driveway is further based on the difficulty score being higher than the predetermined difficulty threshold.

6. The method of claim 1, further comprising:
   determining by the one or more processors, a first convenience cost to the passenger for picking up or dropping off the passenger on the opposite side of the street as the location;
   determining, by the one or more processors, a second convenience cost to the passenger for picking up or dropping off the passenger on the same side of the street as the location; and
   comparing, by the one or more processors, the first convenience cost to the second convenience cost;
   wherein the determining to enter the available driveway is further based on the comparison between the first convenience cost and the second convenience cost.

7. The method of claim 6, wherein the determining to enter the available driveway is based on the first convenience cost being higher than the second convenience cost.

8. The method of claim 6, wherein the determining to enter the available driveway is based on a difference between the first convenience cost and the second convenience cost meeting or exceeding a threshold.

9. The method of claim 1, wherein the determining to enter the available driveway is further based on a danger level to cross the street.

10. The method of claim 1, wherein the determining to enter the available driveway is further based on a necessity to maneuver to the same side of the street to complete a trip.

11. The method of claim 1, further comprising:
    determining, by the one or more processors, a driving region of the lane adjacent to the location;
    determining, by the one or more processors based on sensor data from a perception system, that there is sufficient space for the vehicle to enter the available driveway such that a rear end of the vehicle is outside of the driving region; and
    prior to determining to enter the available driveway, determining that the available driveway is available based on the determination that there is sufficient space.

12. The method of claim 1, further comprising:
    determining, by the one or more processors, that the available driveway is within a same set of lot boundaries as the location; and
    selecting, by the one or more processors based on the determination that the available driveway is within the same set of lot boundaries as the location, the available driveway among a plurality of available driveways on the same side of the street as the location.

13. The method of claim 1, further comprising:
    determining, by the one or more processors, that the available driveway is a closest driveway to an entrance of the location; and
    selecting, by the one or more processors based on the determination that the available driveway is the closest driveway to an entrance of the location, the available driveway among a plurality of available driveways on the same side of the street as the location.

14. The method of claim 1, further comprising:
    determining, by the one or more processors, a driving region of the lane adjacent to the location, wherein the controlling the vehicle to enter the available driveway includes adjusting a position of the vehicle such that a rear end of the vehicle is at least a predetermined clearance distance away from the driving region.

15. The method of claim 1, wherein the controlling the vehicle to enter the available driveway includes adjusting a position of the vehicle such that at least one passenger door of the vehicle is at least a predetermined clearance distance away from an object in the available driveway.

16. The method of claim 1, wherein the controlling the vehicle to enter the available driveway includes adjusting a position of the vehicle such that the vehicle is at least a predetermined clearance distance away from an entrance of the location.

17. The method of claim 1, wherein the controlling of the vehicle to enter the available driveway includes controlling a speed of the vehicle below a threshold speed.

18. The method of claim 1, wherein the controlling of the vehicle to enter the available driveway includes controlling the vehicle to perform a multi-point turn on the available driveway.

19. The method of claim 1, wherein the controlling of the vehicle to enter the available driveway includes controlling the vehicle to maintain at least a predetermined clearance distance from an object on the available driveway.

20. A system for maneuvering an autonomous vehicle to enter a driveway, the system comprising:
one or more processors configured to:
receive an instruction to pickup or drop off a passenger at a location;
determine that the vehicle is arriving in a lane on an opposite side of a street as the location, the lane having a traffic direction opposite to a traffic direction of a lane adjacent to the location;
determine a difficulty score for a maneuver for positioning the vehicle to the lane adjacent to the location, the difficulty score being a value representing difficulty of performing the maneuver;
compare the difficulty score to a predetermined difficulty score;
determine, based on the comparison, to enter an available driveway on the same side of the street as the location; and
control, based on the determination to enter the available driveway, the vehicle to enter the available driveway.

* * * * *